US012566239B1

(12) United States Patent
Hong et al.

(10) Patent No.: US 12,566,239 B1
(45) Date of Patent: Mar. 3, 2026

(54) SYSTEMS AND METHODS FOR CENTRALIZED RADAR WITH SPARSE ANTENNAS

(71) Applicant: Oculii Corp., Beavercreek, OH (US)

(72) Inventors: Lang Hong, Beavercreek, OH (US);
Steven Hong, Beavercreek, OH (US);
Lifeng Liu, Beavercreek, OH (US);
Kiran Vaidyanathan, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 368 days.

(21) Appl. No.: 18/129,834

(22) Filed: Apr. 1, 2023

(51) Int. Cl.
| | |
|---|---|
| *G01S 7/00* | (2006.01) |
| *G01S 13/90* | (2006.01) |
| *G01S 13/931* | (2020.01) |
| *G01S 13/86* | (2006.01) |

(52) U.S. Cl.
CPC .......... *G01S 7/003* (2013.01); *G01S 13/9058* (2019.05); *G01S 13/931* (2013.01); *G01S 13/867* (2013.01)

(58) Field of Classification Search
CPC .... G01S 7/003; G01S 13/9058; G01S 13/931; G01S 13/867
See application file for complete search history.

(56) References Cited

U.S. PATENT DOCUMENTS

| | | | | |
|---|---|---|---|---|
| 11,536,801 | B1 * | 12/2022 | Li | G01S 13/58 |
| 11,906,655 | B2 * | 2/2024 | Vossiek | G01S 13/87 |
| 12,117,520 | B1 * | 10/2024 | Armstrong-Crews | G01S 13/86 |
| 12,228,638 | B2 * | 2/2025 | Homma | G01S 7/415 |
| 2006/0238406 | A1 * | 10/2006 | Nohara | G01S 7/068 342/197 |
| 2020/0242930 | A1 * | 7/2020 | Ran | G08G 1/22 |
| 2022/0187418 | A1 * | 6/2022 | Bialer | G01S 7/292 |
| 2022/0196798 | A1 * | 6/2022 | Chen | G01S 7/354 |
| 2022/0214457 | A1 * | 7/2022 | Liang | G06N 3/04 |
| 2024/0168148 | A1 * | 5/2024 | Wu | G01S 13/343 |

FOREIGN PATENT DOCUMENTS

CN          218727993 U  *  3/2023

OTHER PUBLICATIONS

CN_218727993_U_I_translate.pdf (Year: 2023).*

* cited by examiner

*Primary Examiner* — David R Dunn
*Assistant Examiner* — Yonghong Li
(74) *Attorney, Agent, or Firm* — Maiorana Patent Law, PA

(57) ABSTRACT

An apparatus comprising an interface and a processor. The interface may receive radar data from a plurality of radar devices. The radar device may each be implemented at a respective edge site. The radar data may comprise sparsity. The processor may be configured to receive the radar data corresponding to each of the radar devices from the interface, perform virtual aperture imaging in response the radar data, and generate high resolution radar data based on the virtual aperture imaging. The sparsity may be used to capture the radar data may enable the radar data to have a low data volume. The virtual aperture imaging may be configured to enable the high resolution radar data to be generated from the low data volume. The processor may enable high data throughput at a central location for the radar data generated at the respective edge sites.

20 Claims, 11 Drawing Sheets

100

250

SPARSE RX ARRAY

280

DENSE RX ARRAY

350

352

MULTIPLE PHYSICAL
SPARSE ANTENNA
DATA ARRAYS 254a   254b
302a
254i 254a   254b
302b   302c
254i   254i

130

CENTRALIZED VAI
TECHNOLOGY

354

DENSE CENTRALIZED VIRTUAL ANTENNA DATA

356aa   312a         356ay

310a

302a

254a

310i

312i

302b

356zy

356za        302c        312z   310z

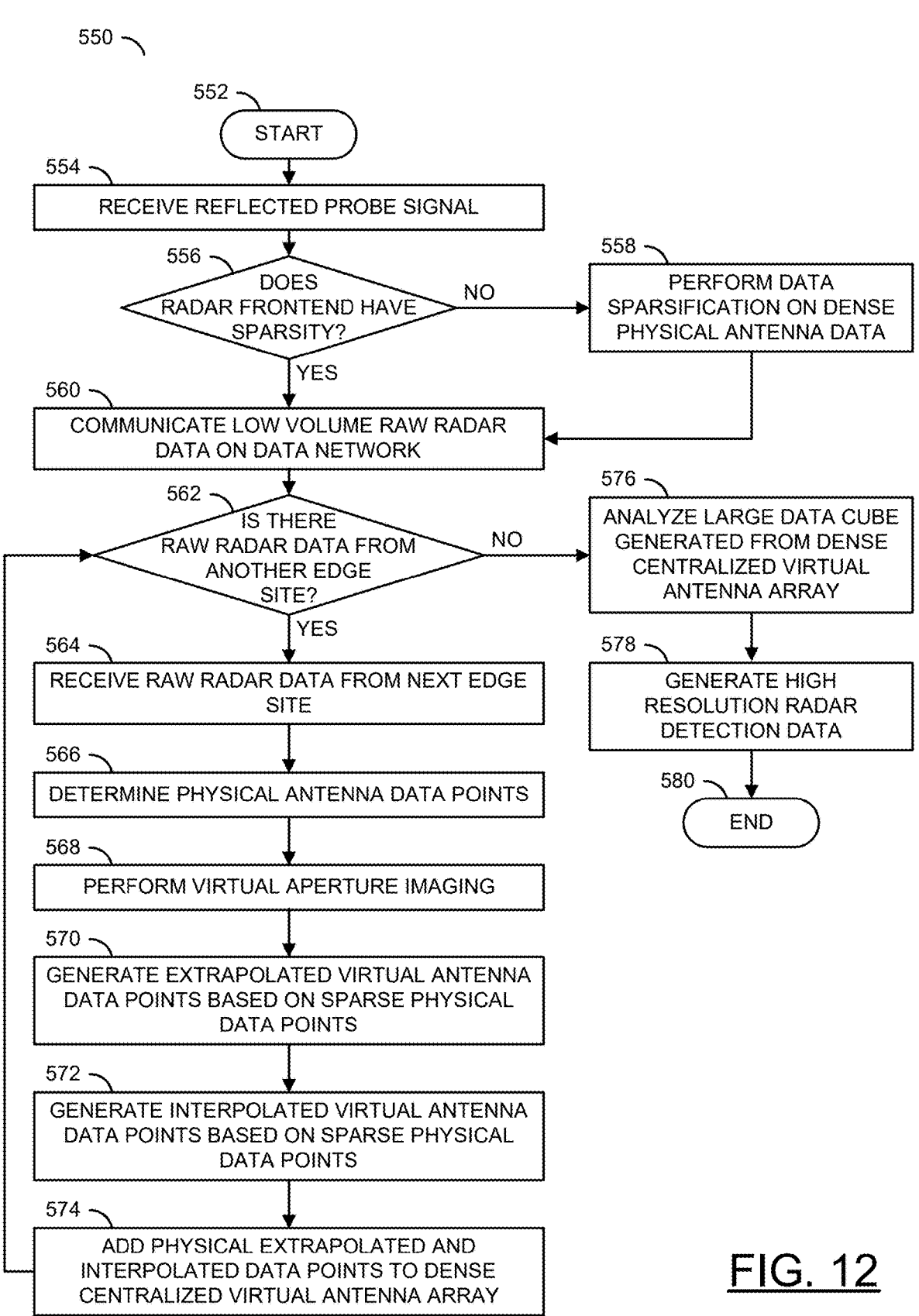

550

552 — START

554 — RECEIVE REFLECTED PROBE SIGNAL

556 — DOES RADAR FRONTEND HAVE SPARSITY? — NO → 558 — PERFORM DATA SPARSIFICATION ON DENSE PHYSICAL ANTENNA DATA

YES

560 — COMMUNICATE LOW VOLUME RAW RADAR DATA ON DATA NETWORK

562 — IS THERE RAW RADAR DATA FROM ANOTHER EDGE SITE? — NO → 576 — ANALYZE LARGE DATA CUBE GENERATED FROM DENSE CENTRALIZED VIRTUAL ANTENNA ARRAY

YES

564 — RECEIVE RAW RADAR DATA FROM NEXT EDGE SITE

566 — DETERMINE PHYSICAL ANTENNA DATA POINTS

568 — PERFORM VIRTUAL APERTURE IMAGING

570 — GENERATE EXTRAPOLATED VIRTUAL ANTENNA DATA POINTS BASED ON SPARSE PHYSICAL DATA POINTS

572 — GENERATE INTERPOLATED VIRTUAL ANTENNA DATA POINTS BASED ON SPARSE PHYSICAL DATA POINTS

574 — ADD PHYSICAL EXTRAPOLATED AND INTERPOLATED DATA POINTS TO DENSE CENTRALIZED VIRTUAL ANTENNA ARRAY

578 — GENERATE HIGH RESOLUTION RADAR DETECTION DATA

580 — END

FIG. 12

SYSTEMS AND METHODS FOR CENTRALIZED RADAR WITH SPARSE ANTENNAS

FIELD OF THE INVENTION

The invention relates to radar detection generally and, more particularly, to a method and/or apparatus for implementing systems and methods for centralized radar with sparse antennas.

BACKGROUND

Systems that implement a radar architecture implement a number of radar frontend devices at a number of edge sites. Conventional radar architectures implement an edge radar architecture. In systems that implement a conventional radar architecture, the raw radar data generated has a high data volume. The high data volume collected by the radar frontend devices at the edge sites is processed locally by the edge radar device. To process the high data volume locally, a processor and a memory may be implemented locally for each radar frontend device (i.e., a transmitter and receiver). Each radar edge device may include transmitters and receivers, which provide a dense array of physical data (i.e., a high volume of data) to a local processor and a local memory. The results generated from the processing of the high data volume (i.e., detections) are a lower data volume than the raw radar data collected. The results are then streamed to a central Electronic Control Unit (ECU). The ECU may use the results for various applications.

The edge radar architecture has a number of limitations. Each local processor and local memory has limited local signal processing capability. The limited local signal processing results in limited radar detections. Local processing inherently prevents continuous data streaming. Without continuous data streaming, a data cube size generated by the radar frontend has a limited size, which limits the radar resolution. The limited local memory results in limitations on the size of the data cube that can be stored, which also limits the radar resolution. Since a data network can have a limited bandwidth, the raw data from the receivers is not able to be communicated to a central ECU. Instead, only the detections are sent to an ECU. Without the raw data, the ECU does not have full access to available data. Since each edge radar device has the complete RF front-end (i.e., receivers and transmitters) as well as a local processing unit (i.e., a local memory and a local controller) each edge radar device has a high cost.

It would be desirable to implement systems and methods for centralized radar with sparse antennas.

SUMMARY

The invention concerns an apparatus comprising an interface and a processor. The interface may be configured to receive raw radar data from a plurality of radar devices. The plurality of radar devices may each be implemented at a respective edge site. The raw radar data may comprise sparsity. The processor may be configured to receive the raw radar data corresponding to each of the radar devices from the interface, perform virtual aperture imaging in response the raw radar data, and generate high resolution radar data based on the virtual aperture imaging. The sparsity may be used to capture the raw radar data may enable the raw radar data to have a low data volume. The virtual aperture imaging may be configured to enable the high resolution radar data to be generated from the low data volume. The processor may enable high data throughput at a central location for the raw radar data generated at the respective edge sites.

BRIEF DESCRIPTION OF THE FIGURES

Embodiments of the invention will be apparent from the following detailed description and the appended claims and drawings.

FIG. 12 is a flow diagram illustrating a method for performing centralized virtual aperture imaging using sparse raw radar data.

DETAILED DESCRIPTION OF THE EMBODIMENTS

Figure 1:
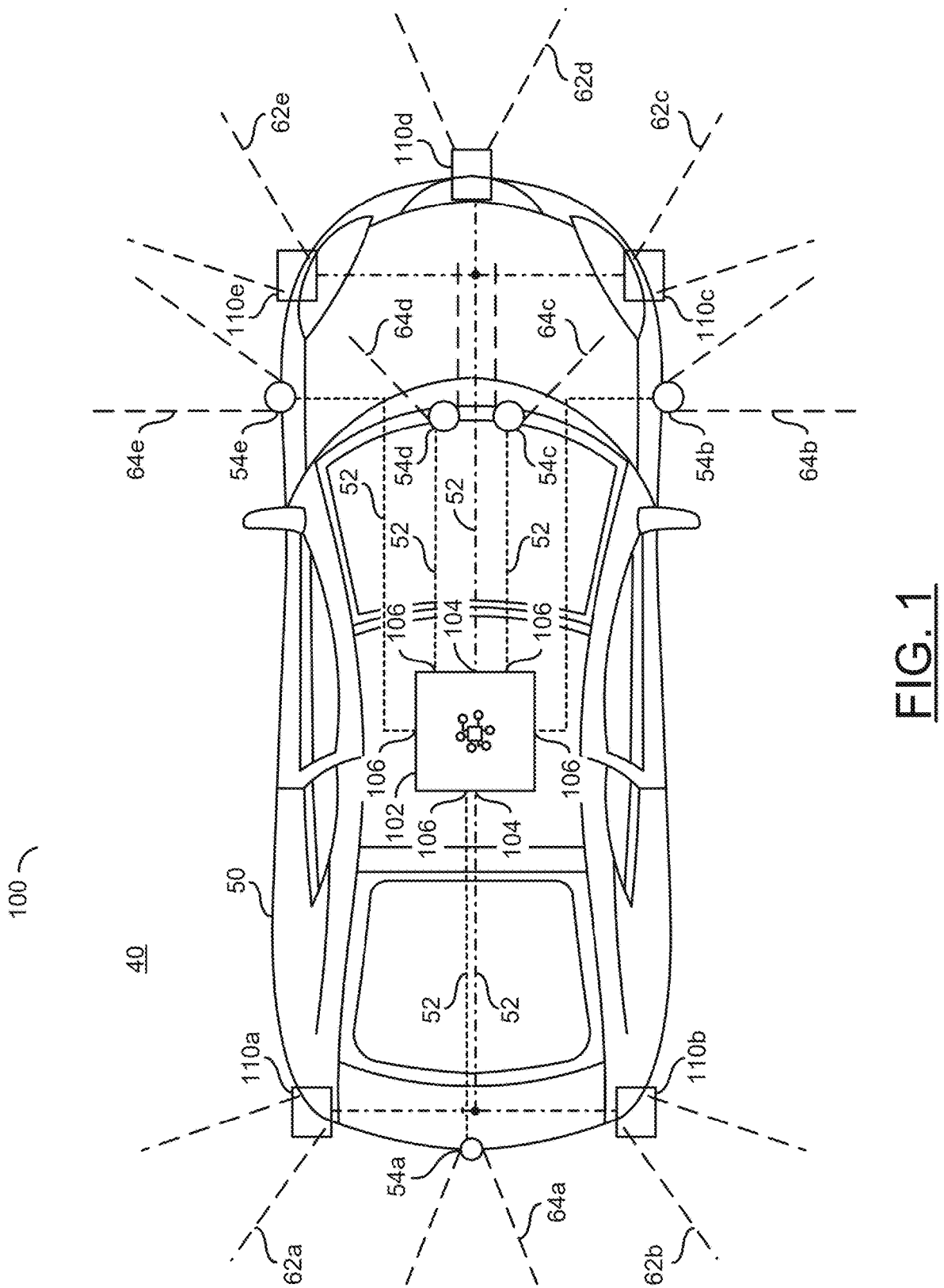
FIG. 1 is a diagram illustrating an embodiment of the present invention implemented in a vehicle.

Embodiments of the present invention include providing systems and methods for centralized radar with sparse antennas that may (i) implement centralized virtual aperture imaging, (ii) implement deep sensor fusion for multiple types of raw sensor data, (iii) implement dynamic resource allocation at a centralized processor, (iv) enable a low volume of raw radar data to be collected from multiple radar devices over a bandwidth limited network, (v) generate a high resolution of radar output in response to low volume raw radar data with sparsity, (vi) implement a single powerful processor instead of multiple low powered local processors, (vii) implement a high capacity of memory as a centralized resource instead of multiple low capacity local memories, (viii) collect continuous radar data from multiple edge sites throughout a vehicle and/or (ix) be implemented as one or more integrated circuits.

Embodiments of the present invention may be configured to provide a system configured to implement a centralized radar architecture with sparse antennas. A centralized processing device may be implemented. The centralized processing device may comprise at least a processor and a memory. The centralized processing device may be configured to implement centralized virtual aperture imaging. The amount of processing throughput and/or the capacity of the memory implemented by the centralized processing device may be varied according to the design criteria of a particular implementation.

Embodiments of the present invention may be configured to receive data from multiple radar frontend devices. Each radar frontend device may comprise transmitters and receivers with sparsity. The radar frontend devices may be configured to generate raw radar data with a low data volume. The low data volume raw radar data may be communicated over a data network. In the example of a centralized radar architecture with sparsity in a vehicle, the data network may be a low bandwidth network (e.g., a CAN bus). The low data volume raw radar data may be received by the centralized processing device from the data network. Using the centralized virtual aperture imaging, the centralized processing device may convert the low volume raw radar data to virtually generate large data cubes that may provide a high resolution radar output (e.g., high resolution detections). The high resolution radar outputs may be used by the centralized processing device for various applications (e.g., object detection, distance measurements, proximity alerts, etc.). Since the centralized processing device provides a large amount of central memory and high processing capability, the various radar processing tasks may share the resources of the centralized processing device. For example, the various tasks may be performed centrally by the centralized processing device instead of implementing multiple individual Electronic Control Units (ECUS).

Implementing the centralized radar architecture with sparse antennas may provide a number of advantages over conventional radar architectures (e.g., edge radar architectures and centralized radar architectures without sparsity). The centralized radar architecture may enable the radar frontends to be implemented at the edge sites without local processing. Without local processing (e.g., a local processor and a local memory implemented for each of the radar frontends), the overall cost of the radar system may be reduced. Generally, the local processing may have limited throughput capabilities and/or may act as a data bottleneck. By eliminating the local processing, the centralized radar architecture with sparse antennas may enable continuous data streaming from the radar frontends. Continuous data streaming may enable data cubes with large sizes to be generated from the raw radar data, which may enable a high resolution for the radar output and/or a high radar output throughput. For example, with a single central processor implemented with the centralized radar architecture with sparsity, more detections may be processed (e.g., compared to local processing and/or implementing multiple ECUs). Similarly, with a centralized memory (e.g., virtually unlimited memory may be available compared to the capacity limitations of local memories), more detections may be processed.

A centralized radar architecture without sparsity may overcome some of the limitations (e.g., implementing a single central processor and central memory may overcome complications of implementing multiple local memory, complications of implementing multiple local processors, high cost, etc.) of the edge radar architecture. However, without sparsity, each of the radar frontends may generate a high volume of raw radar data. Since the volume of the raw radar data from the antennas with no sparsity may be inherently high, each radar frontend may produce a high volume of data (e.g., requiring access to a high bandwidth data network). Data network limitations (e.g., limitations of commercially available data networks implemented in vehicles) may prevent the high volume of data generated without sparsity to be communicated to a central processor. The limitations of available networks may limit the volume of raw data that may be communicated, which may limit an achievable radar performance using the centralized radar architecture without sparsity. The high volume of raw data may further limit sensor data from other sources from being communicated over the data network.

The sparsity implemented by embodiments of the present invention may enable the raw radar data to be generated with a low data volume. The low data volume may not saturate the data network (e.g., low cost commercially available data networks). The low data volume of the raw radar data may be streamed continuously to the centralized processing device. Since the low data volume may not saturate the data network, additional data may also be communicated over the data network. For example, a vehicle may implement various sensors (e.g., camera systems, lidar, sonar, impact sensors, brake sensors, etc.). The various sensors may communicate other type of raw sensor data. The other types of raw sensor data may be received by the centralized processing device along with the raw radar data. Using the raw radar data and the other types of raw sensor data, the centralized processing device may be configured to perform deep sensor fusion. The deep sensor fusion may analyze output from all types of sensors at a raw data level. For example, the deep sensor fusion implemented by centralized processing device may be configured to analyze various data from disparate source in order to make inferences about the data that may not be possible from a single data source alone. Various sensors in addition to the radar frontends may stream raw data to the centralized processor. Centralized deep fusion may be achieved with raw data from all sensors at the richest information level.

Embodiments of the present invention may be configured to implement centralized dynamic resource allocation and/or scheduling. The centralized dynamic resource allocation and/or scheduling may enable resources and/or the allocation of resources to be dynamically adjusted. The dynamic adjustment of the allocation of the resources may be selected based on particular application tasks and/or the environment. The centralized processing architecture may enable the dynamical resources allocation and/or dynamical sensor scheduling.

Embodiments of the present invention may be configured to implement the centralized virtual aperture imaging (CVAI). CVAI may be configured to receive sparse antenna data from multiple sparse arrays of physical antennas. The CVAI may be configured to extrapolate and/or interpolate the physical antenna data to create a dense array of virtual antenna data. The dense array of virtual antenna data generated may provide information for the large data cube that may be used to generate the high resolution radar output in response to the low volume of raw radar data.

Referring to FIG. 1, a diagram illustrating an embodiment of the present invention implemented in a vehicle is shown. A system 100 is shown. The example embodiment of the system 100 may be shown in the context of a top down view of a vehicle 50 in an environment 40. In the example shown, the vehicle 50 may be a car. In some embodiments, the vehicle 50 may be a truck, an ATV, an airplane, a drone, etc. In one example, the vehicle 50 may be an electric vehicle (EV). In another example, the vehicle 50 may be a hybrid electric vehicle. In yet another example, the vehicle 50 may be an internal combustion engine (ICE) vehicle. The type of the vehicle 50 implementing the system 100 may be varied according to the design criteria of a particular implementation.

The vehicle 50 may comprise a data network 52, a number of blocks (or circuits) 54a-54e, a block (or circuit) 102, an interface 104, and interface 106 and/or a number of blocks (or circuits) 110a-110e. The circuits 54a-54e may each implement a camera system. The circuit 102 may implement a centralized processing device. The circuits 110a-110e may each implement a radar device and/or frontend. While the radar frontends 110a-110e and the camera systems 54a-54e are shown, the vehicle 50 may comprise more or fewer of the radar frontends 110a-110e and/or the camera systems 54a-54e. In some embodiments, the vehicle 50 may comprise multiple implementations of the centralized processing device 102. The vehicle 50 may comprise other components (not shown). For example, other types of sensors may be implemented (e.g., sonar, lidar, ultrasonics, etc.). The number, type and/or arrangement of the components of the vehicle 50 may be varied according to the design criteria of a particular implementation.

The data network 52 may be implemented throughout the vehicle 50. The data network 52 may be configured to communicate data from an edge site of the vehicle 50 (e.g., an edge site at the locations of the radar frontends 110a-110e and/or the camera systems 54a-54e) to other components of the vehicle 50. In an example, the data network 52 may be configured to communicate data from various sensors to corresponding ECUs. In another example, the data network 52 may be configured to communicate data to/from the centralized processing device 102. The data network 52 may be configured to communicate data according to a pre-defined protocol (e.g., a CAN bus communications protocol, an I2C bus protocol, an Ethernet protocol, a wireless protocol, etc.). Generally, the data network 52 may comprise a low bandwidth, low cost data bus implemented by the vehicle 50 (e.g., data buses that may be common in commercially available vehicles). In one example, the data network 52 may implement a CAN bus of the vehicle 50. In some embodiments, the amount of data communicated throughout the vehicle 50 may be limited to the constraints of the data network 52. The implementation of the data network 52 may be varied according to the design criteria of a particular implementation.

The centralized processing device 102 may be configured to communicate data to/from the data network 52. The centralized processing device 102 may comprise the interface 104 and/or the interface 106. The interface 104 may be a radar data interface. The radar data interface 104 may be configured to receive data communicated by the radar frontends 110a-110e via the data network 52. The radar data interface 104 may be configured to send data generated from the centralized processing device 102 via the data network 52 to one or more of the radar frontends 110a-110e. The interface 106 may be a video data interface. The video data interface 106 may be configured to receive data communicated by the camera systems 54a-54e via the data network 52. The video data interface 106 may be configured to send data generated from the centralized processing device 102 via the data network 52 to one or more of the camera systems 54a-54e. Additional interfaces (e.g., a sensor data interface) may be implemented by the centralized processing device 102 (e.g., to communicate data to/from various other sensors, not shown). In some embodiments, the radar data interface 104 and/or the video data interface 106 may comprise a number of data ports. The radar data interface 104 and/or the video data interface 106 may be configured to convert and/or translate data for compatibility with the communication standard implemented by the data network 52. The number, type and/or implementation of the radar data interface 104, the video data interface 106 and/or other interfaces of the centralized processing device 102 may be varied according to the design criteria of a particular implementation.

The radar devices (or frontends) 110a-110e may be located at various edge sites of the vehicle 50. The edge sites of the vehicle 50 may be located at a periphery of the vehicle 50 and/or throughout the vehicle 50. In the example shown, the radar frontend 110d may be implemented on a front bumper of the vehicle 50. In another example, the radar frontends 110a-110b are shown implemented on either side of a rear bumper of the vehicle 50. In some embodiments, one or more of the radar frontends 110a-110e may be implemented on a periphery of the vehicle 50. In some embodiments, one or more of the radar frontends 110a-110e may be implemented on a roof the vehicle 50. The of number radar frontends 110a-110e implemented and/or the particular edge sites of the vehicle 50 that the radar frontends 110a-110e may be implemented at may be varied according to the design criteria of a particular implementation.

The radar frontends 110a-110e may each be configured to determine a proximity and/or location of objects/obstacles around the vehicle 50. The radar frontends 110a-110e may be configured as long-range and/or short-range sensors. The radar frontends 110a-110e may be configured to generate a radar (or probe) signal, which may be reflected back to the radar frontends 110a-110e by the objects near the vehicle 50. The reflected data received by the radar frontends 110a-110e corresponding to the radar signal may be processed and/or analyzed in order to generate data about the objects in the environment 40 near the vehicle 50. In some embodiments, the data generated by the radar frontends 110a-110e may be used by the centralized processing device 102 to create a radar mapping of the environment 40.

Pairs of dashed lines 62a-62e are each shown extending from a respective one of the radar frontends 110a-110e. The pairs of dashed lines 62a-62e may represent a radio frequency pattern emitted by the respective radar frontends 110a-110e. The shape, intensity and/or direction of the radio frequency patterns 62a-62e may determine a detection range of the radar frontends 110a-110e. The radar frontends 110a-110e may be implemented at various locations around the vehicle 50. The radio frequency patterns 62a-62e may be generally emitted all around the vehicle 50 in order to capture data about the environment 40 in all directions from the vehicle 50. The radio frequency patterns 62a-62e may have a range of approximately 200 meters to 450 meters, with a 150 degree azimuth field of view and a 45 degree elevation field of view. The particular range of the radio frequency patterns 62a-62e may be varied according to the design criteria of a particular implementation.

The radar frontends 110a-110e may each implement an antenna array and/or waveguide network. The antenna array and/or waveguide network implemented by the radar frontends 110a-110e may enable a sparse array configured to provide information that may be used by the centralized processing device 102 to reconstruct a high resolution of data. In an example, the radar frontends 110a-110e may each be configured to generate a dynamic waveform and the centralized processing device 102 may use artificial intelligence to learn from and/or adapt to the environment 40 near the vehicle 50. The sparse array implemented by the radar frontends 110a-110e may enable a high resolution of data to be acquired with a low module cost. The radar frontends 110a-110e may be configured to generate raw radar data at a low volume that may be converted to a high resolution of data while consuming between 3 watts to 10 watts of power.

Details of the antenna array and/or waveguide network implemented by the radar frontends 110a-110e may be described in association with U.S. application Ser. No. 17/945,379, filed on Sep. 15, 2022 and U.S. application Ser. No. 17/958,268, filed on Sep. 30, 2022, appropriate portions of which are incorporated by reference.

In some embodiments, the radar frontends 110a-110e may comprise antenna arrays that generate raw radar data with sparsity (e.g., low volume data). In some embodiments, the radar frontends 110a-110e may comprise antenna arrays with a dense array that generate raw radar data without sparsity (e.g., high volume data). In some embodiments, the radar frontends 110a-110e may comprise a combination of radar devices with sparsity and without sparsity. Radar data without sparsity may undergo data sparsification (e.g., as an aftermarket add-on) to convert the high volume of data to a low volume of data before being sent over the data network 52.

The camera systems 54a-54e may be configured to capture pixel data, generate images and/or generate video frames of the environment 40 near the vehicle 50. In some embodiments, the pixel data may be communicated over the data network 52 to the centralized processing device 102 and the centralized processing device 102 may be configured to generate video frames in response to the pixel data. In some embodiments, the camera systems 54a-54e may be configured to generate video frames in response to the pixel data captured, compress the video frames and the compressed video frames may be communicated over the data network 52 to the centralized processing device 102. The video frames generated based on the data from the camera systems 54a-54e may be used for computer vision operations to detect objects/obstacles around the vehicle 50. The camera systems 54a-54e may comprise RGB cameras, RGB-IR cameras, stereo cameras, monocular cameras, thermal imaging cameras, etc. The number and/or types of the camera systems 54a-54e implemented may be varied according to the design criteria of a particular implementation.

Pairs of dashed lines 64a-64e are each shown extending from a respective one of the camera systems 54a-54e. The pairs of dashed lines 64a-64e may represent a field of view captured by the camera systems 54a-54e. The fields of view 64a-64e of the camera systems 54a-54e may or may not overlap with the regions covered by the radio frequency patterns 62a-62e of the radar frontends 110a-110e. The camera systems 54a-54e may be implemented at various locations (e.g., edge sites) around the vehicle 50. The fields of view 64a-64e may be generally captured all around the vehicle 50 in order to capture data of the environment 40 in all directions from the vehicle 50 (e.g., a 360 degree field of view). The particular range and/or directions of the fields of view 64a-64e may be varied according to the design criteria of a particular implementation.

The centralized processing device 102 is shown at a generally central location in the vehicle 50. In an example, the centralized processing device 102 may implement a zone (or domain) processor. The centralized processing device 102 may be configured to receive input comprising the output from the radar frontends 110a-110e (e.g., raw radar data) and/or the video frames generated by the camera systems 54a-54e. In some embodiment, multiple implementations of the centralized processing device 102 may be implemented near groups (or clusters) of the radar frontends 110a-110e and/or the camera systems 54a-54e (e.g., at a particular zone of the vehicle 50). The location(s) of the centralized processing device 102 and/or the number of the radar frontends 110a-110e and/or camera systems 54a-54e that provide data to the centralized processing device 102 may be varied according to the design criteria of a particular implementation.

The centralized processing device 102 may be configured to process raw data streams generated by the radar frontends 110a-110e, the camera systems 54a-54e and/or other sensors. The centralized processing device 102 may be configured to implement deep sensor fusion in order to combine interpretations of the data from the radar frontends 110a-110e with interpretations of the data from the camera systems 54a-54e and/or data inputs from other sensors (not shown) in order to make inferences using multiple sources of data that would not be possible based on one of the data sources alone. In an example, the centralized processing device 102 may be configured to interpret the high resolution data generated in response to the low volume data provided by the radar frontends 110a-110e. In another example, the centralized processing device 102 may be configured to perform computer vision operations on the video frames generated by the camera systems 54a-54e in order to detect objects.

The centralized processing device 102 may be configured to implement central compute capabilities that enable high performance without implementing a dedicated processor for each of the radar frontends 110a-110e. Implementing the centralized processing device 102 may enable the radar frontends 110a-110e to be implemented at a lower cost because a dedicated processor may not be implemented for each of the radar frontends 110a-110e. The centralized processing device 102 may be configured to enable sparsity in the implementation of the radar frontends 110a-110e in order to determine the boundary conditions for a particular resolution of data. The centralized processing device 102 may enable the radar frontends 110a-110e to undersample the environment while preventing artifacts, grading lobes and/or false alarms.

The centralized processing device 102 may be configured to adaptively modulate the information generated by the radar frontends 110a-110e to enable fewer antennas to be implemented in the antenna arrays of the radar frontends 110a-110e. Instead of processing data from the radar frontends 110a-110e at the edge (e.g., one processor on-board with the same technology node for each of the radar frontends 110a-110e), the sparse (e.g., low volume) raw radar data from the radar frontends 110a-110e may be processed by the centralized processing device 102. The sparse antenna array implemented by the radar frontends 110a-110e may enable low bandwidth data to be transmitted from the radar frontends 110a-110e over the data network 52 to the centralized processing device 102. The centralized processing device 102 may be configured to expand the resolution of the data received from the radar frontends 110a-110e. The centralized processing device 102 may be configured to dynamically shift radar processing capabilities around the vehicle 50 on an as-needed basis in response to various detection scenarios. The centralized processing device 102 may be configured to implement joint bistatic processing from multiple of the distributed radar frontends 110a-110e to provide a high resolution and/or sensitivity.

The centralized processing device 102 may utilize a dynamic adaptive waveform. The centralized processing device 102 may learn and/or adapt to the environment 40. The centralized processing device 102 may take advantage of sparsity to capture the boundary conditions for the data that may be used for providing a particular resolution. Sparsity may undersample the environment 40. To avoid grading lobes and/or artifacts that may result from multiple solutions that may be available for reconstructing a dense amount of data using sparsity, an adaptive waveform may be implemented. The adaptive waveform used for the radio frequency patterns 62a-62e may provide a shifting waveform that may be effectively controlled in a deterministic fashion. By adaptively modulating the information, fewer antennas may be used by each of the radar frontends 110a-110e. Artifacts from the sparsity may be suppressed by aggregating information that may be adaptive over time. The adaptive waveform implemented may provide a sparse data cube that may enable reconstructing a high resolution of radar detections that no longer scales with the number of antennas implemented by the radar frontends 110a-110e. The high resolution of the radar detections may scale with how efficiently the centralized processing device 102 performs computations and/or how quickly a phase may be modulated onto the adaptive transmitted signal.

Figure 2:
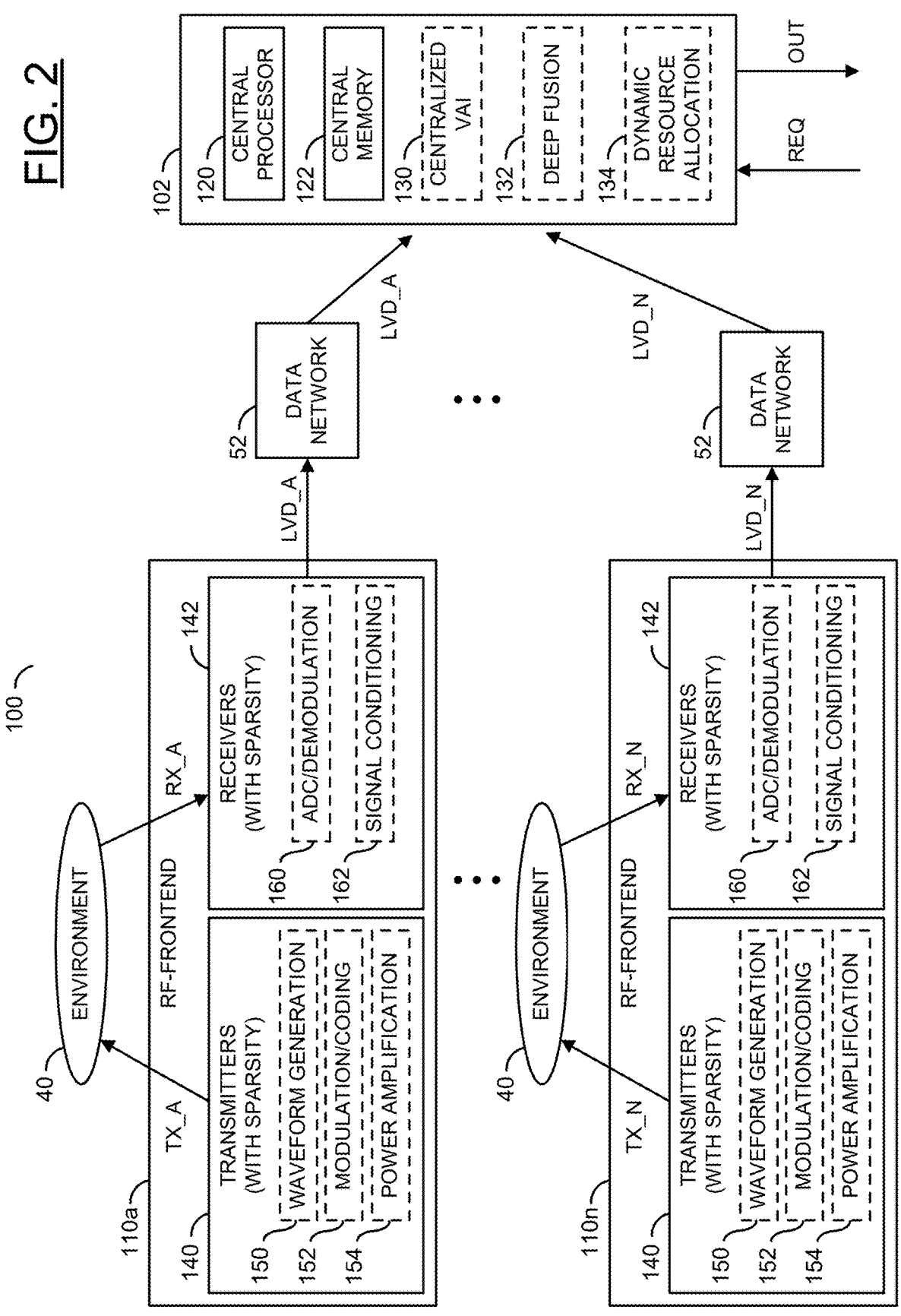
FIG. 2 is a block diagram illustrating an example embodiment of a centralized radar system with sparse antennas.

Referring to FIG. 2, a block diagram illustrating an example embodiment of a centralized radar system with sparse antennas is shown. The apparatus 100 is shown comprising the centralized processing device 102 and/or the radar frontends 110a-110n. The radar frontends 110a-110n may each be configured to transmit data to and/or receive data from the environment 40. The radar frontends 110a-110n may each be configured to communicate with the centralized processing device 102 via the data network 52.

The centralized processing device 102 may comprise a block (or circuit) 120 and/or a block (or circuit) 122. The block 120 may implement a central processor. The block 122 may implement a central memory. The centralized processing device 102 may comprise other components (not shown). The central processor 120 and/or the central memory 122 may be configured to implement a block (or module) 130, a block (or module) 132 and/or a block (or module) 134. The module 130 may implement centralized virtual aperture imaging (CVAI). The module 132 may implement centralized deep sensor fusion. The module 134 may implement dynamic resource allocation and/or dynamic scheduling. The number, type and/or arrangement of the components of the centralized processing device 102 and/or the functionality implemented by the centralized processing device 102 may be varied according to the design criteria of a particular implementation.

Each of the radar frontends 110a-110n may comprise a block (or circuit) 140 and/or a block (or circuit) 142. The circuit 140 may implement a transmitter. The circuit 142 may implement a receiver. The radar frontends 110a-110n may comprise other components (not shown). The number, type and/or arrangement of the components of the radar frontends 110a-110n may be varied according to the design criteria of a particular implementation.

The transmitters 140 of the radar frontends 110a-110n may be configured to generate respective signals (e.g., TX_A-TX_N). The signals TX_A-TX_N may be output signals transmitted to the environment 40. In an example, each of the signals TX_A-TX_N may be a probe signal. Each of the probe signals TX_A-TX_N generated may comprise individual waveform characteristics. In an example, a first probe signal TX_A generated by the transmitter 140 of the radar frontend 110a may comprise a first distinct (or unique or predefined) waveform characteristic, then a second probe signal TX_A generated by the transmitter 140 of the radar frontend 110a may comprise a second distinct (or unique or predefined) waveform, etc. In some embodiments, each of the probe signals TX_A-TX_N may cycle through a predefined set of a number of distinct waveform characteristics. In some embodiments, each of the probe signals TX_A-TX_N may comprise the same waveform characteristic during the same timeframe (e.g., at a first timeframe, each of the probe signals TX_A-TX_N may emit the first waveform characteristic from different edge sites to the environment 40, then at a second timeframe, each of the probe signals TX_A-TX_N may emit the second waveform characteristic from different edge sites to the environment 40, etc.). The types of the probe signals TX_A-TX_N generated may be varied according to the design criteria of a particular implementation.

The transmitters 140 may each comprise a block (or circuit) 150, a block (or circuit) 152 and/or a block (or circuit) 154. The block 150 may implement a waveform generation module. The block 152 may implement a modulation/coding module. The block 154 may implement a power amplification module. The transmitters 140 may each comprise other components (not shown). The number, type and/or arrangement of the components of the transmitters 140 may be varied according to the design criteria of a particular implementation.

The waveform generation module 150 may be configured to generate the probe signals TX_A-TX_N comprising the various waveform characteristics. The modulation/coding module 152 may be configured to select a communication frequency for the waveform characteristics for the probe signals TX_A-TX_N. In an example, the modulation/coding module 152 may select a high frequency carrier signal and/or channel for communicating the probe signals TX_A-TX_N. The power amplification module 154 may be configured to provide a power level for the probe signals TX_A-TX_N. For example, in response to the power level selected by the power amplification module 154 and the frequency selected by the modulation/coding module 152, the waveform generation module 150 may output the probe signals TX_A-TX_N from the transmitters 140 with the distinct waveform characteristics.

The receivers 142 of the radar frontends 110a-110n may be configured to receive respective signals (e.g., RX_A-RX_N) and/or generate respective signals (e.g., LVD_A-LVD_N). The signals RX_A-RX_N may be input signals received from the environment 40. In an example, each of the probe signals TX_A-TX_N may be reflected back from objects in the environment 40 and received as the reflected signals RX_A-RX_N. The receivers 142 may be configured to perform various operations on the reflected signals RX_A-RX_N. For example, the operations performed by the receivers 142 may enable the various waveform characteristics of the transmitted signals TX_A-TX_N to be extracted and/or isolated in the reflected signals RX_A-RX_N. The reflected signals RX_A-RX_N may correspond to the waveform characteristics of the probe signals TX_A-TX_N.

The signals LVD_A-LVD_N may comprise raw radar data generated by the receivers 142. The operations performed by the receivers 142 may be configured to generate the raw radar data LVD_A-LVD_N in response to the reflected signals RX_A-RX_N. Generally, the raw radar data LVD_A-LVD_N may comprise a low volume of data. For example, the low volume of data of the raw radar data LVD_A-LVD_N may be enabled because of the sparsity of the antenna arrays of the transmitters 140 and the receivers 142. In one example, the antenna arrays implemented by the transmitters 140 and/or the receivers 142 implementing the sparse antenna array may comprise twelve antenna heads. The raw radar data LVD_A-LVD_N may be transmitted to the data network 52.

The receivers 142 may each comprise a block (or circuit) 160 and/or a block (or circuit) 162. The block 160 may implement an analog to digital conversion (ADC) and/or demodulation module. The block 162 may implement a signal conditioning module. The receivers 142 may each comprise other components (not shown). The number, type and/or arrangement of the components of the receivers 142 may be varied according to the design criteria of a particular implementation.

The ADC and/or demodulation module 160 may be configured to perform analog to digital conversion and/or demodulation operations on the reflected signals RX_A-RX_N. The ADC operations may comprise sampling and/or quantization in order to convert the analog reflected signals RX_A-RX_N to a digital version that may be operated on digitally. The demodulation operations may be configured to retrieve the waveform characteristics from the reflected signals RX_A-RX_N that may have been adapted to a particular transmission channel. In an example, the demodulation operations may extract and/or isolate the waveform characteristics in the reflected signals RX_A-RX_N (e.g., the unique characteristics that correspond to the probe signals TX_A-TX_N). The signal conditioning module 154 may be configured to prepare the reflected signals RX_A-RX_N for communication via the data network 52. For example, in response to waveform characteristics extracted from the reflected signals RX_A-RX_N by the demodulation module 160, the signal conditioning module 162 may output the raw radar data LVD_A-LVD_N from the receivers 142.

In the example shown, each of the transmitters 140 and/or the receivers 142 implemented by the radar frontends 110a-110n may implement sparsity. For example, each of the radar frontends 110a-110n may comprise the transmitters 140 and/or the receivers 142 without implementing a local memory and/or a local processor. For example, each of the radar frontends 110a-110n may generate the raw radar data LVD_A-LVD_N with the low data volume, and rely on the centralized processing device 102 to generate the high resolution data from the raw radar data LVD_A-LVD_N.

In some embodiments, not all of the radar frontends 110a-110n of the apparatus 100 may implement sparsity. In an example, one or more of the radar frontends 110a-110n may be implemented without sparsity. In the example, where with the radar frontends without sparsity, each of the radar frontends 110a-110e that do not implement sparsity may generate a high volume of raw radar data. For example, the volume of data in the raw radar data LVD_A-LVD_N generated with sparsity may be less than the high volume of the raw radar data generated without sparsity (e.g., by a factor of sixteen).

In another example, one or more of the radar frontends 110a-110n may be implemented with local memories and/or local processors. The local processors implemented by the radar frontends 110a-110n may analyze the high volume of raw radar data generated by the receivers 142 (without sparsity) and determine radar detections. The local processors implemented by the radar frontends 110a-110n may comprise a high volume of data that may be communicated over the data network 52. Generally, the apparatus 100 may be implemented with each of the radar frontends 110a-110n implemented with sparsity and the centralized processing device 102 may receive the low volume raw radar data LVD_A-LVD_N communicated over the data network 52. However, in some embodiments, the centralized processor 102 may be configured to be backwards compatible and/or operate as an aftermarket addition to the vehicle 50 that may be configured to also work with a high volume of raw radar data generated by radar devices that do not implement sparsity and/or radar devices that implement local memories and local processors that provide radar detection output. In some embodiments, the apparatus 100 may comprise a data sparsification module that may be installed in the radar frontends 110a-110n that may convert raw radar data without sparsity to raw radar data with sparsity before the data is sent to the data network 52, which may be described in association with FIG. 6.

The central processor 120 may be configured to execute computer readable instructions. In response to executing the computer readable instructions, the central processor 120 may be configured to perform a number of steps. The central processor 120 may be configured to receive the raw radar data LVD_A-LVD_N from the radar frontends 110a-110n (e.g., at the radar data interface 104). For example, the receivers 142 may communicate the low volume raw radar data LVD_A-LVD_N to the data network 52 and the central processor 120 may receive the raw radar data LVD_A-LVD_N from the data network 52. The central processor 120 may be configured to perform virtual aperture imaging in response to the raw radar data LVD_A-LVD_N. For example, the central processor 120 may use the virtual aperture imaging to receive the continuous stream of the raw radar data LVD_A-LVD_N to generate a large size data cube representing the information detected about the environment 40. The central processor 120 may be configured to generate high resolution radar data based on the virtual aperture imaging. The high resolution radar data may provide radar detections.

In some embodiments, the central processor 120 may implement one or more coprocessors, cores and/or chiplets. For example, the central processor 120 may implement one coprocessor configured as a general purpose processor and another coprocessor configured as a video processor. In some embodiments, the central processor 120 may be a dedicated hardware module designed to perform particular tasks. In an example, the central processor 120 may implement an AI accelerator. In another example, the central processor 120 may implement a radar processor. In some embodiments, other processors implemented by the apparatus 100 may be generic processors and/or video processors (e.g., a coprocessor that is physically a different chipset and/or silicon from the central processor 120). In one example, the central processor 120 may implement an x86-64 instruction set. In another example, the central processor 120 may implement an ARM instruction set. In yet another example, the central processor 120 may implement a RISC-V instruction set. The number of cores, coprocessors, the design optimization and/or the instruction set implemented by the central processor 120 may be varied according to the design criteria of a particular implementation.

The central memory 122 may provide data storage for the apparatus 100. The central memory 122 may be configured to store the computer readable instruction that may be executed by the central processor 120. The central memory 122 may be configured to store video data, the raw radar data LVD_A-LVD_N, data cubes, high resolution radar detections and/or sensor output. The central memory 122 may provide volatile and/or non-volatile storage. The central memory 122 may provide mass data storage. The central memory 122 may comprise embedded memory and/or removable storage. In an example, the central memory 122 may implement a cache. In another example, the central memory 122 may implement a SD card (or microSD card). The central memory 122 may be configured to store training data for an AI model. The type and/or capacity of the central memory 122 may be varied according to the design criteria of a particular implementation.

The combination of the central processor 120 and the central memory 122, may enable the radar frontends 110a-110n to be implemented with no individual local processors and/or no individual local memories. The central processor 120 may provide more processing capabilities than a local processor that may be implemented by each edge radar device that does not implement the apparatus 100. Similarly, the central memory 122 may provide more memory capacity than a local memory that may be implemented by each radar device that does not implement the centralized radar architecture of the apparatus 100. In one example, the central processor 120 may be configured to provide a processing bandwidth of approximately 1.3G (ADC samples/s) compared to a typical local processor (e.g., implemented at the edge sites with the radar frontends 110a-110n) that may provide a processing bandwidth of 31M (ADC samples/s). In another example, the central memory 122 may comprise approximately 32 GB of memory (or more) compared to a typical memory of a local processor (e.g., implemented at the edge sites with the radar frontends 110a-110n) that may provide approximately 8 MB of memory. The central processor 120 may be configured to be implemented on modern technology and/or fabrication nodes. In an example, the central processor 120 may be implemented on a 5 nm technology node, while a local processor may be limited to a technology node used for the radar transceiver (e.g., the local processors may not be optimized for digital processing and may be constrained by technology used for RF processing). The combination of the central processor 120 and the central memory 122 may be configured to implement the CVAI 130, the centralized deep sensor fusion module 132, the dynamic resource allocation module 134 and/or the dynamic scheduling.

The CVAI 130 may be configured to receive the low volume raw radar LVD_A-LVD_N from each of the radar frontends 110a-110n. The CVAI 130 may be configured to perform virtual aperture imaging for reconstructing high resolution detections based on the each of the signals LVD_A-LVD_N. The virtual aperture imaging may be configured to use the waveform characteristics in the raw radar data LVD_A-LVD_N in order to generate physical antenna data, extrapolated virtual antenna data and/or interpolated virtual antenna data. For example, the virtual aperture imaging may enable additional data points (e.g., the extrapolated virtual antenna data and/or the interpolated virtual antenna data) to be generated in order to provide a high resolution of data based on the sparse physical antenna data. The virtual aperture imaging may enable a dense array of virtual antenna data to be provided in response to the sparse arrangement of the physical antennas implemented by one of the radar frontends 110a-110n. Details of the virtual aperture imaging may be described in association with U.S. application Ser. No. 17/832,278 filed on Jun. 3, 2022 (issued as U.S. Pat. No. 11,561,299), U.S. application Ser. No. 17/556,221 filed on Dec. 20, 2021, U.S. application Ser. No. 16/704,409, filed Dec. 5, 2019 (issued as U.S. Pat. No. 11,243,304), U.S. application Ser. No. 16/503,908, filed Jul. 5, 2019 (issued as U.S. Pat. No. 10,564,277), U.S. application Ser. No. 16/032, 369, filed Jul. 11, 2018 (issued as U.S. Pat. No. 10,509,119), and U.S. application Ser. No. 15/883,372, filed Jan. 30, 2018 (issued as U.S. Pat. No. 10,048,366), appropriate portions of which are incorporated by reference.

The CVAI 130 may be configured to perform the virtual aperture imaging operations for each of the radar frontends 110a-110n. The CVAI 130 may be configured to expand the dense virtual antenna data from each of the radar frontends 110a-110n into a centralized dense array of virtual antenna data. Details of the centralized dense array of virtual antenna data may be described in association with FIG. 8. Based on the centralized dense array of virtual antenna data, the CVAI 130 may be configured to generate a high resolution of radar detections that may be unable to be determined from the physical antenna data of each of the radar frontends 110a-110n alone.

The centralized deep sensor fusion module 132 may be configured to receive raw sensor data from multiple sensor data sources. In one example, the centralized deep sensor fusion module 132 may be configured to receive pixel data and/or video frames generated by the camera systems 54a-54n implemented on the vehicle 50. In another example, the centralized deep sensor fusion module 132 may be configured to receive raw sonar data, raw lidar data, raw ultrasonic data, raw gyroscope data, raw G-force data, etc. The centralized deep sensor fusion module 132 may be configured to evaluate the combination of raw data in order to make decisions based on a rich level of information. The centralized deep sensor fusion module 132 may enable the camera systems 54a-54n and/or other sensor systems to be implemented at a lower cost because the centralized deep sensor fusion module 132 may perform the data analysis instead of implementing individual ECUs for each sensor. Details of the centralized deep fusion module 132 may be described in association with FIG. 3.

The dynamic resource allocation module 134 may be configured to allocate and/or schedule various resources of the apparatus 100 and/or the vehicle 50. The dynamic resource allocation module 134 may be configured to shift resources depending on what aspects may benefit from additional resources. In an example, the dynamic resource allocation module 134 may determine an amount of processing time for the central processor 120 and/or an amount of capacity of the central memory 122 to assign for various tasks. The dynamic resource allocation module 134 may be configured to analyze upcoming tasks and/or the types of tasks in order to determine how to allocate available resources. Details of the dynamic resource allocation module 134 may be described in association with FIG. 4.

The central processor 120 may be configured to generate a signal (e.g., OUT) and/or receive a signal (e.g., REQ). The signal OUT may comprise an output of the centralized processing device 102. The signal OUT may be presented to various components of the vehicle 50. In one example, the signal OUT may comprise the high resolution radar detections. In another example, the signal OUT may comprise inferences and/or decisions made in response to deep sensor fusion operations. In yet another example, the signal OUT may comprise information about resource allocation. In still another example, the signal OUT may comprise information about resource scheduling. The signal OUT may be used for various applications (e.g., proximity warnings, driver alerts, driving event logging, etc.).

The signal REQ may comprise a request by an external device and/or resource. The signal REQ may comprise a request for data that may be generated by the central processor 120. In an example, the signal REQ may be a request for video data from an infotainment center. In another example, the signal REQ may be a request for radar detections from a proximity alert system. In still another example, the signal REQ may be a request for traffic information near the vehicle 50 from a smartphone connected to the vehicle 50. The type of data generated and/or received by the central processor 120 may be varied according to the design criteria of a particular implementation.

In the centralized radar architecture with antenna sparsity implemented by the apparatus 100, the raw radar data collected by the various radar heads at the edge sites of the vehicle 50 from the radar frontends 110a-110n with sparsity may have a low data volume. The low data volume raw radar data LVD_A-LVD_N may be directly streamed over the data network 52 to the central processor 120. The central processor 120 may be configured to perform the CVAI 130 on the sparse raw data LVD_A-LVD_N at a central site (e.g., instead of at each edge site). The CVAI 130 may virtually generate large data cubes, which may delivers high resolutions of radar detections. The radar outputs in the signal OUT may be generated in response to the large data cubes. The radar outputs in the signal OUT may be used for different applications at the central site (e.g., used by the centralized processing device 102 for applications such as the centralized deep sensor fusion 132) and/or for various applications of the vehicle 50 (e.g., for display on an infotainment system of the vehicle 50). Implementing the centralized processing device 102 at a central site instead of having multiple smaller, less powerful processors may enable access to a large amount of the central memory 122, which may be efficiently shared by all radar processing tasks. Furthermore, intermediate ECUs may be eliminated (e.g., a reduction in overall costs).

Figure 3:
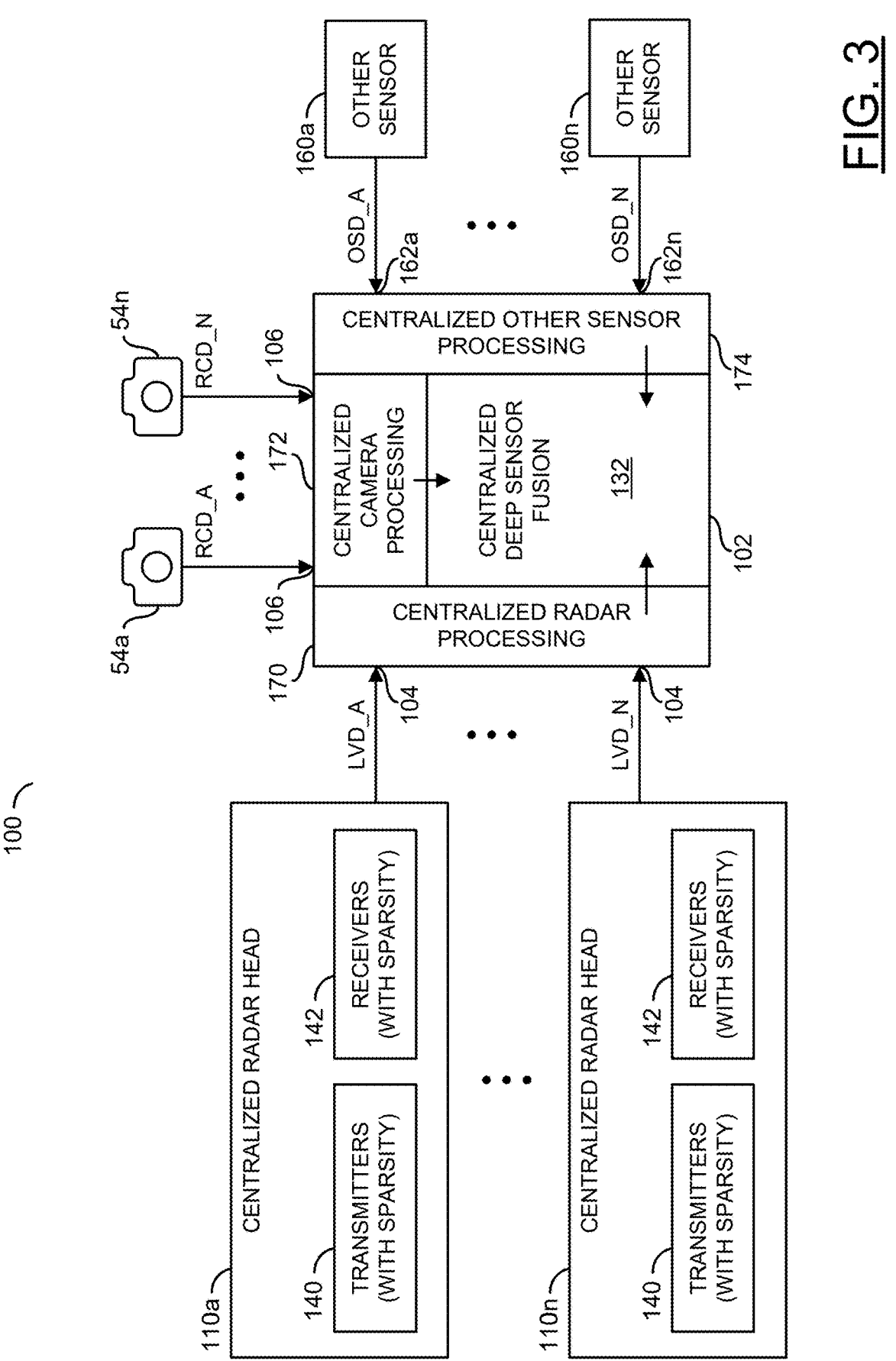
FIG. 3 is a block diagram illustrating centralized deep sensor fusion.

Referring to FIG. 3, a block diagram illustrating centralized deep sensor fusion is shown. The apparatus 100 is shown comprising the radar frontends 110a-110n and the centralized processing device 102. In the example shown, the radar frontends 110a-110n may implement the transmitters 140 with sparsity and the receivers 142 with sparsity. The radar frontends 110a-110n may each generate the low volume raw radar data LVD_A-LVD_N. The raw radar data LVD_A-LVD_N may be received by the centralized processing device 102 at the radar data interface 104.

The apparatus 100 and/or the vehicle 50 may comprise the camera systems 54a-54n and/or blocks (or circuits) 160a-160n. The circuits 160a-160n may comprise other types of sensors. In one example, the other types of sensors 160a-160n may comprise sonar sensors. In another example, the other types of sensors 160a-160n may comprise lidar sensors. In yet another example, the other types of sensors 160a-160n may comprise ultrasonic sensors. In still another example, the other types of sensors 160a-160n may comprise gyroscopes, G-force sensors, accelerometers, microphones, etc. The number and/or type of the other sensors 160a-160n implemented may be varied according to the design criteria of a particular implementation.

Each of the camera systems 54a-54n may be configured to generate a respective signal (e.g., RCD_A-RCD_N). The signals RCD_A-RCD_N may comprise raw camera data. In an example, the raw camera data signals RCD_A-RCD_N may provide pixel data. For example, each of the camera systems 54a-54n may generate pixel data of the environment 40 within the respective fields of view 64a-64n. The signals RCD_A-RCD_N may be communicated over the data network 52. The raw camera data RCD_A-RCD_N may be received by the centralized processing device 102 at the video data interface 106.

Each of the other types of sensors 160a-160n may be configured to generate a respective signal (e.g., OSD_A-OSD_N). The signals OSD_A-OSD_N may comprise raw sensor data. The type of raw sensor data provided in the signals OSD_A-OSD_N may depend on the type of sensors implemented. In an example, one or more of the raw sensor data signals OSD_A-OSD_N may provide lidar data. In another example, one or more of the raw sensor data signals OSD_A-OSD_N may provide acceleration information. In yet another example, one or more of the raw sensor data signals OSD_A-OSD_N may provide traffic information (e.g., received from a third party source of traffic data). For example, each of the other sensor types 160a-160n may generate raw sensor data about the environment 40 based on the information acquired by the sensor. The signals OSD_A-OSD_N may be communicated over the data network 52.

The centralized processing device 102 may implement one or more sensor data interfaces 162a-162n. In some embodiments, the centralized processing device 102 may comprise one of the sensor data interfaces 162a-162n for each type of the other sensors 160a-160n. In some embodiments, the centralized processing device 102 may comprise one sensor data interface (e.g., 162a) for all of the other sensors 160a-160n. In some embodiments, the radar data interface 104, the video data interface 106 and/or the sensor data interfaces 162a-162n may be the same interface. The sensor data OSD_A-OSD_N may be received by the centralized processing device 102 from the data network 52 at the sensor data interfaces 162a-162n.

The centralized processing device 102 may implement the centralized deep sensor fusion module 132, a block (or circuit) 170, a block (or circuit) 172 and/or a block (or circuit) 174. The circuit 170 may implement centralized radar processing. The circuit 172 may implement centralized camera processing. The circuit 174 may implement centralized sensor processing. In some embodiments, the circuits 170-174 may comprise co-processors, dedicated cores of the central processor 120 and/or distinct (e.g., dedicated) hardware modules. In some embodiments, the circuits 170-174 may be implemented on a same silicon as the central processor 120. In some embodiments, the circuits 170-174 may be implemented in response to the central processor 120 and/or the central memory 122 allocating resources to programmable hardware engines and/or selecting the programmable hardware engines for particular tasks.

The centralized radar processing 170 may be configured to perform various operations on the raw radar data LVD_A-LVD_N. The centralized radar processing 170 may be configured to implement the CVAI 130. The centralized radar processing 170 may be configured to generate the large data cubes and/or generate the high resolution radar detections. The centralized radar processing 170 may be configured to combine and/or evaluate the continuous stream of data presented by each of the radar frontends 110a-110n.

The centralized camera processing 172 may be configured to perform various operations on the raw camera data RCD_A-RCD_N. In an example, the centralized camera processing 172 may be configured to process the pixel data in the raw camera data RCD_A-RCD_N as video frames. The centralized camera processing 172 may be configured to generate high resolution video output (e.g., 1080p, 4k, 8k video, etc.) at various framerates (e.g., 15 fps, fps, 60 fps, etc.). The centralized camera processing 172 may be configured to implement various video compression techniques. The centralized camera processing 172 may be configured to perform computer vision operations. In an example, the central memory 122 may be configured to store various feature sets and/or detection libraries, and the centralized camera processing 172 may be configured to implement an artificial neural network (ANN) to detect objects. In an example, the centralized camera processing 172 may implement a convolutional neural network configured to detect objects and/or determine characteristics and behaviors of the detected objects. Details of the hardware and/or the object detection performed by the centralized camera processing 172 may be described in may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,493 (now U.S. Pat. No. 10,437,600) Ser. No. 15/593, 463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), and U.S. patent application Ser. No. 15/403, 540, filed on Jan. 11, 2017 (now U.S. Pat. No. 10,310,768), appropriate portions of which are incorporated by reference. The centralized camera processing 172 may be configured to combine and/or evaluate the continuous stream of raw pixel data presented by each of the camera systems 54a-54n.

The centralized sensor processing 174 may be configured to perform various operations on the raw sensor data OSD_A-OSD_N. The centralized sensor processing 174 may be configured to perform analysis and/or operations on the raw sensor data OSD_A-OSD_N. The type of analysis and/or operations performed may depend on the types of the other sensors 160a-160n implemented. The centralized sensor processing 174 may be configured to perform the analysis of the raw sensor data OSD_A-OSD_N at one central location (or at a zone location), instead of implementing multiple ECUs for each of the other sensors 160a-160n. In one example, the centralized sensor processing 174 may receive raw lidar data from a lidar sensor and determine whether an object is within a predefined proximity of the vehicle 50. In another example, the centralized sensor processing 174 may receive G-force information from a G-force sensor and analyze the amount of force and/or direction of force to determine whether the data corresponds to an impact. In yet another example, the centralized sensor processing 174 may receive a fluid level reading from a sensor measuring washer fluid and the determine whether the amount of fluid is below a predefined level. The types of operations and/or measurements performed by the centralized sensor processing 174 may be varied according to the design criteria of a particular implementation. The centralized sensor r processing 174 may be configured to combine and/or evaluate the continuous stream of raw data presented by each of the other sensors 160a-160n.

The centralized processing device 102 may be configured to implement the centralized deep sensor fusion module 132. The centralized deep sensor fusion module 132 may be configured to receive a stream of all of the raw data in order to receive a rich information level. For example, all of the sensor data (e.g., radar, camera, accelerometer, lidar, sonar, etc.) may be processed by the central processor 120 using the centralized deep sensor fusion module 132. In an example, the centralized radar processing 170 may forward the raw radar data LVD_A-LVD_N and/or present the high resolution data, the large data cubes, radar detections, etc. to the centralized deep sensor fusion module 132. In another example, the centralized camera processing 172 may forward the raw camera data RCD_A-RCD_N and/or present the video frames, the detected objects, the object locations, the object characteristics, etc. to the centralized deep sensor fusion module 132. In yet another example, the centralized sensor processing 174 may forward the raw sensor data OSD_A-OSD_N and/or present various measurements and/ or detections based on the sensor data to the centralized deep sensor fusion module 132.

The centralized deep sensor fusion module 132 may be configured to analyze the disparate sources of information together. For example, the centralized deep sensor fusion module 132 may combine and/or evaluate all the raw data and/or detections in order to determine inferences that may not be available based on a single one of the data sources alone. Using the rich level of information available from all the sensors of the vehicle 50, the centralized deep sensor fusion module 132 may understand a context for the information about the environment 40 gathered by the radar frontends 110a-110e, the camera systems 54a-54n and/or the other sensors 160a-160n.

In an example, the other sensor 160a may provide a fluid level of washer fluid in the vehicle 50 and the centralized sensor processing 174 may determine that the washer fluid level is low, and the camera system 54a implementing the field of view 64a behind the vehicle 50 may capture video frames and the centralized camera processing 172 may detect a fluid behind the vehicle. Using only the centralized sensor processing 174, a low fluid level warning may be generated. However, using the centralized deep sensor fusion module 132 to combine the information about the low fluid level (e.g., determined by the centralized sensor processing 174) and the fluid dripping behind the vehicle 50 (e.g., determined by the centralized camera processing 172) together, the centralized deep sensor fusion module 132 may determine that the washer fluid tank of the vehicle 50 may have a leak.

In another example, the radar frontend 110a may provide raw radar data and the centralized radar processing 170 may provide a distance measurement to an object in front of the vehicle 50, and the G-force sensor 160b may provide a direction and amount of force and the centralized sensor processing 174 may determine the vehicle 50 has stopped. Using only the centralized sensor processing 174, a reason for stopping the vehicle 50 may be unknown. However, using the centralized deep sensor fusion module 132 to combine information about the vehicle 50 stopping (e.g., determined by the centralized sensor processing 174) and the distance measurement of an object (e.g., determined by the centralized radar processing 170) together, the centralized deep sensor fusion module 132 may determine that the driver intentionally stopped the vehicle 50 because of a nearby object.

In yet another example, the combination of distance measurements to objects provided by the centralized radar processing 170, the classification of the objects provided by the centralized camera processing 172 and/or the distance information from lidar in foggy conditions provided by the centralized sensor processing 174 may be analyzed together by the centralized deep sensor fusion module 132 in order to determine a detailed mapping of all the objects (including object types, object locations, behavior of objects) in the environment 40 in a 360 degree view around the vehicle 50 that may be available in all weather conditions. The types of inferences that the centralized deep sensor fusion module 132 may determine may be varied according to the design criteria of a particular implementation.

Implementing the radar frontends 110a-110n with sparsity may break a fundamental trade off in radar processing of needing more antennas to get higher resolution. Leveraging sparsity in the design may enable the overall data cube to reduce the number of physical samples that may be needed for reconstructing high resolution detections.

Figure 4:
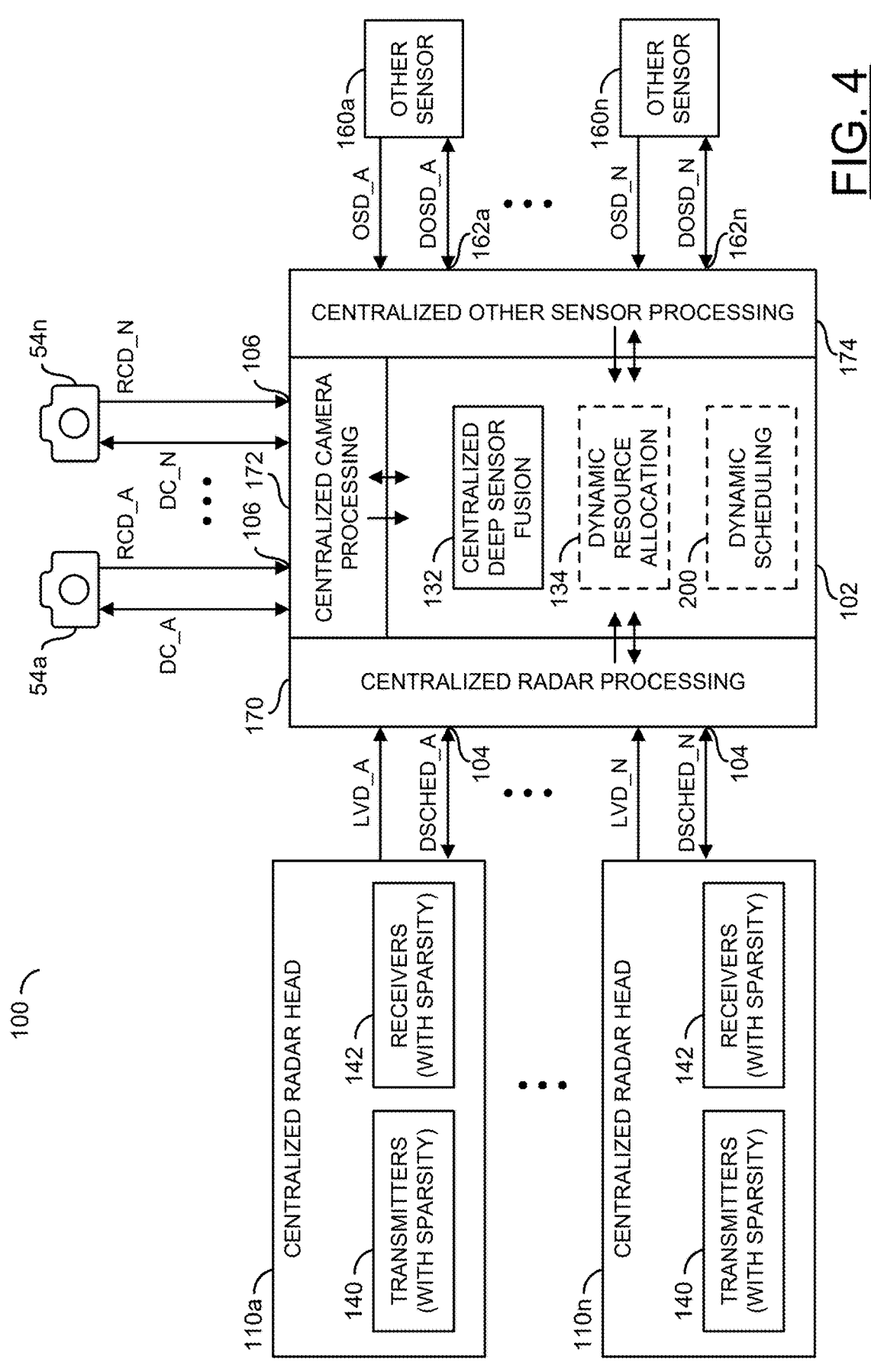
FIG. 4 is a block diagram illustrating an example embodiment of the present invention implementing dynamic resource allocation.

Referring to FIG. 4, a block diagram illustrating an example embodiment of the present invention implementing dynamic resource allocation is shown. The apparatus 100 is shown comprising the radar frontends 110a-110n and the centralized processing device 102. In the example shown, the radar frontends 110a-110n may implement the transmitters 140 with sparsity and the receivers 142 with sparsity. The radar frontends 110a-110n may each generate the low volume raw radar data LVD_A-LVD_N. The raw radar data LVD_A-LVD_N may be received by the centralized processing device 102 at the radar data interface 104. The camera systems 54a-54n may each generate the raw camera data RCD_A-RCD_N, which may be received at the video data interface 106. The other sensors 160a-160n may each generate the raw sensor data OSD_A-OSD_N, which may be received at the sensor data interfaces 162a-162n. The centralized processing device 102 may implement the centralized deep sensor fusion module 132, the centralized radar processing 170, the centralized camera processing 172 and/ or the centralized sensor processing 174, as described in association with FIG. 3.

In the example shown, the centralized processing device 102 may further comprise the dynamic resource allocation module 134 and/or a block (or circuit) 200. The circuit 200 may implement a dynamic scheduling module. In some embodiments, the dynamic scheduling module 200 may be implemented by a co-processor, a dedicated core of the central processor 120 and/or distinct (e.g., dedicated) hardware modules. In some embodiments, the dynamic scheduling module 200 may be implemented on a same silicon as the central processor 120. In some embodiments, the dynamic scheduling module 200 may be implemented in response to the central processor 120 and/or the central memory 122 allocating resources to programmable hardware engines and/or selecting the programmable hardware engines for particular tasks. The architecture of the centralized processing device 102 may make the dynamical resources allocation and/or dynamical sensor scheduling possible.

The dynamic resource allocation module 134 may be configured to determine an amount of resources to enable for particular devices. In an example, the dynamic resource allocation module 134 may be configure to assign, reserve and/or allocate compute resources, memory resources, bandwidth (e.g., within the centralized processing device 102 and/or on the data network 52), etc. The resources allocated to each device by the dynamic resource allocation module 134 may be determined in response to particular application tasks that may be performed and/or the environment 40. In some embodiments, the dynamic resource allocation module 134 may receive the upcoming applications task from the central processor 120 and/or the central memory 122. In some embodiments, the dynamic resource allocation module 134 may determine the upcoming application tasks and/or information about the environment 40 based on the decisions made by the centralized deep sensor fusion module 132. In some embodiments, the dynamic resource allocation module 134 may determine the upcoming application tasks and/or information about the environment 40 based on the detections determined by the centralized radar processing 170, the centralized camera processing 172 and/or the centralized sensor processing 174. In some embodiments, the dynamic resource allocation module 134 may determine the upcoming application tasks from the signal REQ. The method of determining the upcoming application tasks, details about the environment 40 and/or the amount of resources to allocate for each device may be varied according to the design criteria of a particular implementation.

In some embodiments, the dynamic resource allocation module 134 may disable access to resources for particular devices in order to save power. In an example, in clear conditions (e.g., sunny, no fog, no rain) data from the camera systems 54a-54 and/or the radar frontends 110a-110n may be sufficient for the centralized processing device 102 to detect objects around the vehicle 50. For example, to save power, the other sensor 160a implementing lidar may be disabled by the dynamic resource allocation module 134. In another example, in foggy conditions, visibility using the camera systems 54a-54n may be low but the other sensor 160a implementing the lidar may provide distance and/or object information. In response to detecting the foggy conditions, the dynamic resource allocation module 134 may disable the centralized camera processing 172 and enable the other sensor 160a implementing the lidar. In yet another example, a user may select a higher resolution format (e.g., 4k video) for the camera systems 54a-54n, which may cause the raw camera data signals RCD_A-RCD_N to occupy a large proportion of the bandwidth available on the data network 52. In order to accommodate the higher bandwidth used by the camera systems 54a-54n, the dynamic resource allocation module 134 may reduce a data update frequency of the radar frontends 110a-110n and/or the other sensors 160a-160n. The dynamic resource allocation module 134 may further allocate more of the computer resources of the central processor 120 and/or allocate more of the central memory 122 to performing the centralized camera processing 172 and/or reduce the allocation of the central processor 120 and/or the central memory 122 for the centralized radar processing 170 and/or the centralized sensor processing 174.

The dynamic scheduling module 200 may be configured to schedule the various devices of the apparatus 100 and/or the vehicle 50. In an example, the scheduling performed by the dynamic scheduling module 200 may comprise adjusting when to turn on sensors, a scope of the sensors, the data volume to be streamed by the sensors, etc. in real-time. The dynamic scheduling module 200 may work together with the dynamic resource allocation module 134. For example, the dynamic scheduling module 200 may determine the scheduling for the radar frontends 110a-110n, the camera systems 54a-54n and/or the other sensors 160a-160n in response to the resource allocation performed by the dynamic resource allocation module 134.

The centralized processing device 102 may be configured to communicate signals (e.g., DSCHED_A-DSCHED_N) between the radar frontends 110a-110n. Each of the signals DSCHED_A-DSCHED_N may be communicated to a respective one of the radar frontends 110a-110n via the radar data interface 104. The centralized processing device 102 may be configured to communicate signals (e.g., DC A-DC N) between the camera systems 54a-54n. Each of the signals DC A-DC N may be communicated to a respective one of the camera systems 54a-54n via the video data interface 106. The centralized processing device 102 may be configured to communicate signals (e.g., DOSD_A-DOSD_N) between the other sensors 160a-160n. Each of the signals DOSD_A-DOSD_N may be communicated to a respective one of the other sensors 160a-160n via the sensor data interfaces 162a-162n.

The signals DSCHED_A-DSCHED_N may be generated by the dynamic scheduling module 200 in order to schedule the radar frontends 110a-110n. In an example, the signals DSCHED_A-DSCHED_N may be generated by the radar frontends 110a-110n in order to provide the dynamic scheduling module 200 operating statistics of the radar frontends 110a-110n (e.g., detection frequency, on/off status, data rate, etc.). In another example, the signals DSCHED_A-DSCHED_N may be generated by the dynamic scheduling module 200 in order to schedule and/or select modes of operations for the radar frontends 110a-110n (e.g., turn on/off, increase/decrease detection frequency, increase/decrease data rate, etc.).

The signals DC A-DC N may be generated by the dynamic scheduling module 200 in order to schedule the camera systems 54a-54n. In an example, the signals DC_A-DC_N may be generated by the camera systems 54a-54n in order to provide the dynamic scheduling module 200 operating statistics of the camera systems 54a-54n (e.g., frame rate, on/off status, resolution, etc.). In another example, the signals DC A-DC N may be generated by the dynamic scheduling module 200 in order to schedule and/or select modes of operations for the camera systems 54a-54n (e.g., turn on/off, increase/decrease resolution, increase/decrease frame rate, etc.).

The signals DOSD_A-DOSD_N may be generated by the dynamic scheduling module 200 in order to schedule the other sensors 160a-160n. In an example, the signals DOSD_A-DOSD_N may be generated by the other sensors 160a-160n in order to provide the dynamic scheduling module 200 operating statistics of the other sensors 160a-160n (e.g., type of data collected, on/off status, data acquisition rate, data volume per acquisition, etc.). In another example, the signals DOSD_A-DOSD_N may be generated by the dynamic scheduling module 200 in order to schedule and/or select modes of operations for the other sensors 160a-160n (e.g., turn on/off, increase/decrease data acquisition rate, increase/decrease data volume per acquisition, etc.).

In an example, if the camera system 54c fails, the dynamic scheduling module 200 may determine that the camera system 54c is unavailable via the signal DC_C, and the dynamic scheduling module 200 may present the signal DC_D to the camera system 54d in order to enable the camera system 54d to use a wider field of view 64d to compensate for the missing data from the field of view 64c. In response to the wider field of view 64d, the dynamic resource allocation module 134 may allocate additional resources to the centralized camera processing 172 to support the additional dewarping that may need to be performed on the wider angle video frames generated by the camera system 54d. In another example, in low visibility conditions, the dynamic scheduling module 200 may increase a data acquisition rate for the radar frontends 110a-110n via the signals DSCHED_A-DSCHED_N and/or decrease a frame rate for the camera systems 54a-54n via the signals DC A-DC N. The particular types of scheduling performed by the dynamic scheduling module 200 may be varied according to the design criteria of a particular implementation.

Figure 5:
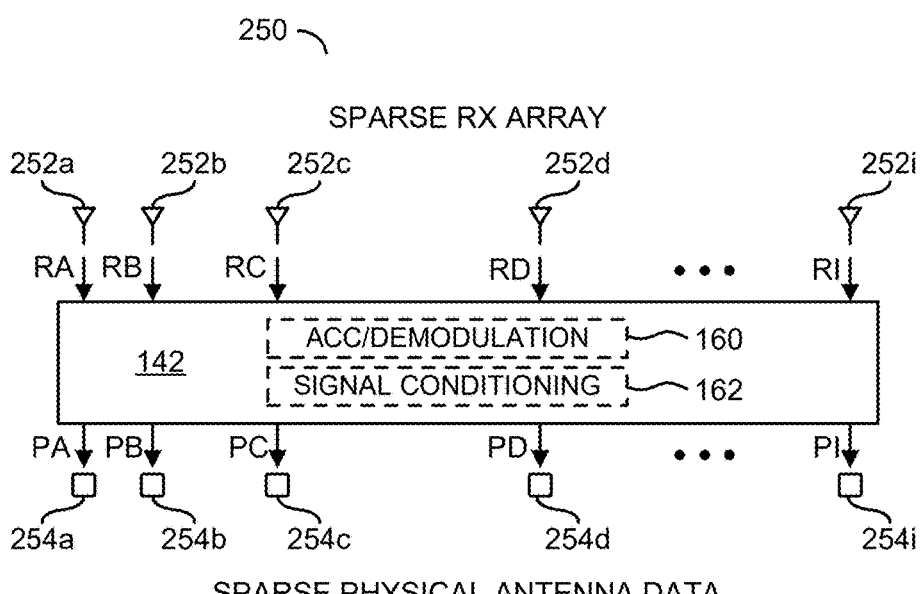
FIG. 5 is a block diagram illustrating data sparsity from a sparse array of receiver antennas.

Referring to FIG. 5, a block diagram illustrating data sparsity from a sparse array of receiver antennas is shown. An example sparse antenna array 250 is shown. The sparse antenna array 250 may be implemented by one or more of the receivers 142 implemented by the radar frontends 110a-110n.

The receiver 142 may comprise a number of antenna heads 252a-252i. Each of the antenna heads 252a-252i may receive one of the reflected signal data RA-RI. The reflected signal data RA-RI may represent one of the reflected signals RX_A-RX_N. For one of the receivers 142 with the sparse antenna array 250, there may be a limited number of the antenna heads 252a-252i. In one example, the sparse antenna array may comprise a 3×4 array of twelve of the antenna heads 252a-252i.

The receiver 142 may comprise the ADC and/or demodulation module 160 and/or the signal conditioning module 162. The receiver 142 may perform various operations on the reflected signal data RA-RI (e.g., analog to digital conversion, demodulation, signal conditioning, etc.) in order to generate physical antenna signal data PA-PI. The physical antenna signal data PA-PI may represent one of the low volume raw radar data LVD_A-LVD_N.

Blocks 254a-254i are shown. The blocks 254a-254i may represent the physical antenna data points. The number of physical antenna data points 254a-254i generated by the receiver 142 may be limited by the number of antenna heads 252a-252i. Since the receiver 142 may implement the sparse antenna array 250 of the antennas 252a-252i, the physical antenna signal data PA-PI may provide sparse physical antenna data points 254a-254i. In an example, one of the radar frontends 110a-110n implementing the sparse antenna array 250 with a 4×3 sparse antenna system may generate a volume per frame of A×B×12 ADC samples, where A may represent a radar cube size along a range and B may represent a Doppler direction.

The physical antenna data points 254a-254i may be presented over the data network 52 as the signals LVD_A-LVD_N. The centralized processing device 102 may be configured to perform the CVAI 130 on the sparse physical data points 254a-254i in order to generate the large data cubes and/or generate the high resolution radar detections.

Figure 6:
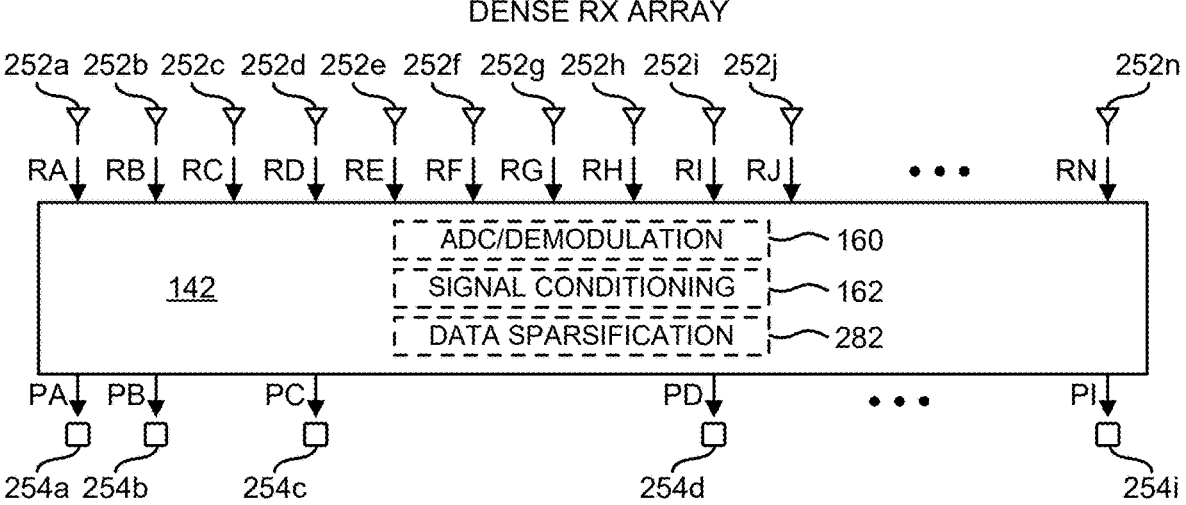
FIG. 6 is a block diagram illustrating data sparsity from a dense array of receiver antennas with data sparsification.

Referring to FIG. 6, a block diagram illustrating data sparsity from a dense array of receiver antennas with data sparsification is shown. An example dense antenna array 280 is shown. The dense antenna array 280 may be implemented by one or more of the receivers 142 implemented by the radar frontends 110a-110n.

The receiver 142 may comprise a number of antenna heads 252a-252n. Each of the antenna heads 252a-252n may receive one of the reflected signal data RA-RN. The reflected signal data RA-RN may represent one of the reflected signals RX_A-RX_N. For one of the receivers 142 with the dense antenna array 280, there may be a large number of the antenna heads 252a-252n. The dense antenna array 280 may comprise more of the antenna heads 252a-252n than the limited number of the antenna heads 252a-252i of the sparse antenna array 250 shown in association with FIG. 5. In one example, the dense antenna array may comprise a 16×12 array of 192 of the antenna heads 252a-252i.

The receiver 142 may comprise the ADC, the demodulation module 160 and/or the signal conditioning module 162 and/or a block (or circuit) 282. The circuit 282 may implement a data sparsification module. The receiver 142 may perform various operations on the reflected signal data RA-RN (e.g., analog to digital conversion, demodulation, signal conditioning, etc.). In order to avoid generating a large volume of raw radar data, the receiver 142 may be configured to perform data sparsification.

The data sparsification module 282 may be configured to provide sparsity from a dense receiver array. The data sparsification may select a subset of the reflected signal data RA-RN from the antenna heads 252a-252n in order to generate a limited number of the physical antenna signal data PA-PI (e.g., reduce the number of data points from N number of points to I number of points). The physical antenna signal data PA-PI may represent one of the low volume raw radar data LVD_A-LVD_N.

The blocks 254a-254i may represent the physical antenna data points generated after the data sparsification. The number of physical antenna data points 254a-254i generated by the receiver 142 may be less than the number of antenna heads 252a-252n implemented. The data sparsification performed may ensure that a limited number of the physical antenna data points 254a-254i are generated. Since the receiver 142 may implement the dense array 280 of the antennas 252a-252n, the sparsification may be performed such that the physical antenna signal data PA-PI may provide sparse physical antenna data points 254a-254i. The physical antenna data points 254a-254i may be presented over the data network 52 as the signals LVD_A-LVD_N. The centralized processing device 102 may be configured to perform the CVAI 130 on the sparse physical data points 254a-254i in order to generate the large data cubes and/or generate the high resolution radar detections.

In some embodiments, the vehicle 50 may be implemented with some or all of the radar frontends 110a-110n implementing dense antenna arrays (e.g., sparse arrays such as the sparse antenna array 250 may not be available). The dense antenna array 280 may capture dense physical data. In order to effectively communicate over the limited bandwidth available to the data network 52 in order to utilize the centralized processing device 102, the data sparsification module 282 may be implemented. The data sparsification module 282 may sparsify the dense physical data in order to generate the sparse physical antenna data 254a-254i before the data is passed through the data network 52. The VAI implemented by the central processor 120 may enable the dense physical data that may have been generated to be virtually recovered. The data sparsification may be performed at the radar frontends 110a-110n using the data sparsification module 282 before data is communicated over the data network 52. In an example without the data sparsification module 282, one of the radar frontends 110a-110n implementing the dense antenna array 280 with a 16×12 dense antenna system may generate a volume per frame of A×B×192 ADC samples, where A may represent a radar cube size along a range and B may represent a Doppler direction. Implementing the data sparsification module 282 may reduce the volume per frame to A×B×12 ADC samples.

The data sparsification performed by the receivers 142 may enable the apparatus 100 to be implemented as an after market product. For example, the apparatus 100 may be configured to perform the CVAI 130, the functions of the deep sensor fusion module 132, the functions of the dynamic resource allocation module 134 and/or the functions of the dynamic scheduling module 200 even in systems that implement radar heads with no sparsity. In one example, the data sparsification module 282 may be connected to the radar frontends 110a-110n at an output of the receivers 142. The data sparsification module 282 may receive the dense physical data points. In response to the dense physical data points and predetermined boundary conditions, the data sparsification module 282 may generate the sparse physical antenna data points 254a-254i. In one example, the data sparsification may reduce the amount of physical data by a factor of 16. In some embodiments, the data sparsification module 282 may implement an AI module configured to determine the boundary conditions for the data sparsification. In some embodiments, the centralized processing device 102 may implement the AI module configured to determine the boundary conditions for the data sparsification from the environment 40 (e.g., based on determinations from the centralized deep sensor fusion module 132) and the signals DSCHED_A-DSCHED_N may provide the boundary conditions to the data sparsification module 282 in real time. The implementation of the data sparsification module 282 may be varied according to the design criteria of a particular implementation.

Figure 7:
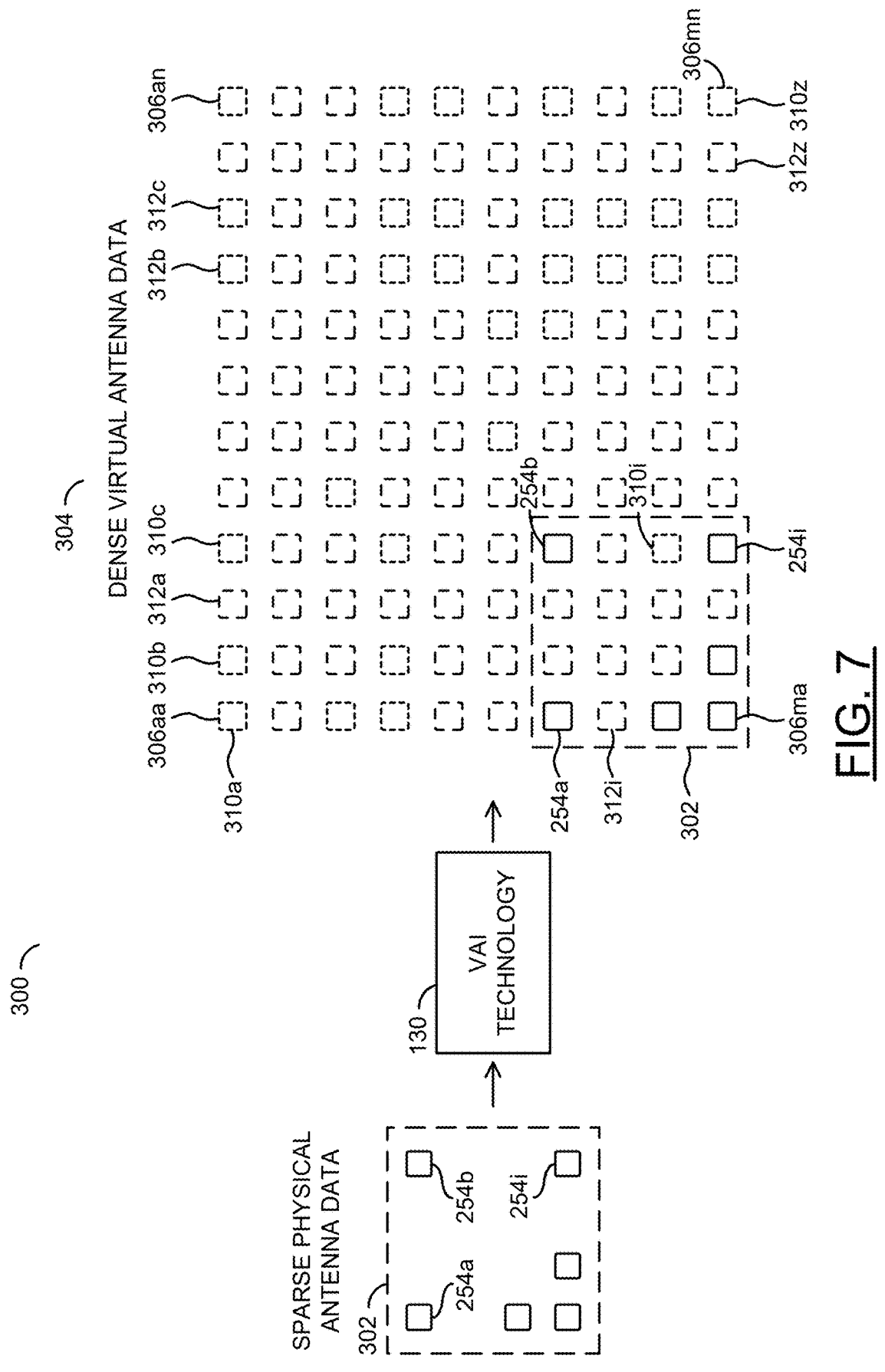
FIG. 7 is a block diagram illustrating an example of VAI technology for a single antenna array.

Referring to FIG. 7, a block diagram illustrating an example of VAI technology for a single antenna array is shown. An example of virtual aperture imaging 300 is shown. The example of virtual aperture imaging 300 may comprise a sparse array of physical antenna data 302, VAI technology implemented by the CVAI 130 and a dense virtual antenna data array 304. The example of virtual aperture imaging 300 may provide a representative example of performing VAI for a single sparse antenna array. For example, the sparse array of physical antenna data 302 may correspond to one of the radar frontends 110a-110n.

The sparse array of physical antenna data 302 may comprise a number of physical antenna data points 254a-254i. The physical antenna data points 254a-254i may be described in association with FIG. 5. Since the radar frontends 110a-110n may comprise the sparse antenna array 250, the number of the physical antenna data points 254a-254i may be limited. The limited number of the physical antenna data points 254a-254i of the sparse array of physical antenna data 302 may provide a low volume of data.

The low volume of raw radar data in the physical antenna data points 254a-254i may be communicated over the data network 52 as one of the signals LVD_A-LVD_N. The physical antenna data points 254a-254i may be received by the centralized processing device 102. The CVAI 130 may implement the VAI technology. The Virtual Aperture Imaging (VAI) technology implemented by the CVAI 130 may be configured to generate the dense virtual antenna data array 304 from the sparse array of physical antenna data 302. The dense virtual antenna data array 304 may be created from the sparse physical antenna data 302 with virtual extrapolation and/or interpolation. In an example, each of the physical antenna data points 254a-254i may be generated in response to one of the reflected signals RX_A-RX_N that was received from the environment 40 based on predefined waveform characteristics of the probe signals TX_A-TX_N. By rotating through a cycle of different waveform characteristics in the probe signals TX_A-TX_N, the physical antenna data points 254a-254i may correspond to the particular waveform characteristics.

The VAI technology may analyze the physical antenna data points 254a-254i based on the predetermined waveform characteristics in order to determine a number of virtual apertures. The virtual apertures may enable additional data points to be generated through interpolation and/or extrapolation as if additional apertures were available at the radar frontends 110a-110n. For example, the virtual apertures may provide interpolated and/or extrapolated data points representing different times and/or locations of data acquisition in addition to the physical antennas 252a-252i. Similarly, when the data sparsification module 282 generates the physical data points 254a-254i, the virtual apertures may enable the additional data points to be reconstructed to approximate the original dense physical data points when the radar frontends 110a-110n implement the dense physical array 280.

The dense virtual antenna data array 304 may comprise a number of data points 306aa-306mn. The data points 306aa-306mn may comprise m rows and n columns of data points for the dense virtual antenna data array 304. The number of data points 306aa-306mn may be much greater than the number of physical antenna data points 254a-254i. In one example, the number of data points 306aa-306mn may provide an increase by a factor of 16 from the original physical antenna data points 254$a$-254$i$ (e.g., from the 12 physical antenna heads 252$a$-252$i$ that provides 12 data points, 196 of the data points 306$aa$-306$mn$ may be generated). The size, shape and/or arrangement of the data points 306$aa$-306$mn$ in the dense virtual antenna data array 304 may be varied according to the design criteria of a particular implementation.

The data points 306$aa$-306$mn$ may comprise the physical antenna data points 254$a$-254$i$. In the example shown, the sparse array of physical antennas 302 comprising the physical antenna data points 254$a$-254$i$ may be in a bottom left corner of the dense virtual antenna data array 304. The sparse array of physical antennas 302 may be located anywhere within the dense virtual antenna data array 304 (e.g., based on the arrangement and/or locations of the physical antennas 252$a$-252$i$, the waveform characteristics of the probe signals TX_A-TX_N, etc.).

Dotted boxes 310$a$-310$z$ are shown in the dense virtual antenna data array 304. The dotted boxes 310$a$-310$z$ may comprise extrapolated virtual antenna data. Dashed boxes 312$a$-312$z$ are shown in the dense virtual antenna data array 304. The dashed boxes 312$a$-312$z$ may comprise interpolated virtual antenna data. The data points 306$aa$-306$mn$ may comprise a combination of the physical antenna data points 254$i$, the extrapolated virtual data points 310$a$-310$z$ and/or the interpolated virtual data points 312$a$-312$z$. Generally, there may be many more of the extrapolated virtual data points 310$a$-310$z$ than the physical antenna data points 254$a$-254$i$. Similarly, there may generally be many more of the interpolated virtual data points 312$a$-312$z$ than the physical antenna data points 254$a$-254$i$. In one example, of 196 of the data points 306$aa$-306$mn$, twelve of the data points 306$aa$-306$mn$ may be the physical antenna data points 254$a$-254$i$ and the remaining 184 of the data points 306$aa$-306$mn$ may be a combination of the extrapolated virtual data points 310$a$-310$z$ and the interpolated virtual data points 312$a$-312$z$.

A number of the extrapolated virtual data points 310$a$-310$z$ may be the same or different than a number of the interpolated data points 312$a$-312$z$. Some of the extrapolated virtual data points 310$a$-310$z$ and/or the interpolated virtual data points 312$a$-312$z$ may be adjacent to and/or in between the physical antenna data points 254$a$-254$i$. In the example shown, the extrapolated virtual data point 310$i$ and the interpolated virtual data point 312$i$ are shown within the boundaries of the sparse array of physical antennas 302 while the other of the extrapolated virtual data points 310$a$-310$z$ and the other of the interpolated virtual data points 312$a$-312$z$ may be outside of the boundaries of the sparse array of physical antennas 302. The number, arrangement and/or locations of the extrapolated virtual data points 310$a$-310$z$ and/or the interpolated virtual data points 312$a$-312$z$ may be varied according to the design criteria of a particular implementation.

The addition of the extrapolated virtual data points 310$a$-310$z$ and/or the interpolated virtual data points 312$a$-312$z$ to the physical antenna data points 254$a$-254$i$ in the dense virtual antenna data array 304 may provide the large size data cubes. By expanding the number of data points from the sparse array of physical antennas 302 with the extrapolated virtual data points 310$a$-310$z$ and the interpolated virtual data points 312$a$-312$z$, the VAI technology may generate the large size data cubes from the low volume raw radar data LVD_A-LVD_N. The dense virtual antenna data array 304 may enable the high resolution radar detections to be generated. The centralized processing device 102 may generate the signal OUT comprising the high resolution radar detections.

Figure 8:
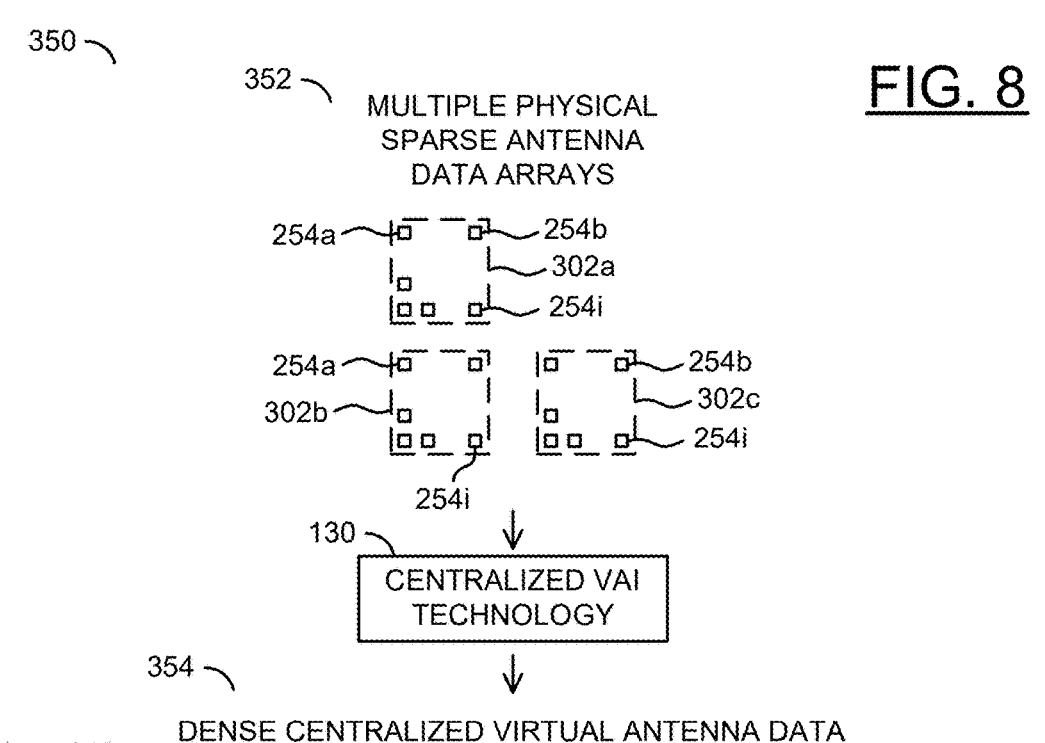
FIG. 8 is a block diagram illustrating an example of centralized VAI for the centralized radar architecture system comprising multiple radar heads.

Referring to FIG. 8, a block diagram illustrating an example of centralized VAI for the centralized radar architecture system comprising multiple radar heads is shown. An example of centralized virtual aperture imaging 350 is shown. The example of the centralized virtual aperture imaging 350 may comprise multiple sparse arrays of physical antenna data 302$a$-302$c$, CVAI technology implemented by the CVAI 130 and a dense centralized virtual antenna data array 354. The example of centralized virtual aperture imaging 350 may provide a representative example of performing VAI at the centralized processing device 102 for multiple sparse antenna arrays. As a representative example, the sparse arrays of physical antenna data 302$a$-302$c$ may correspond to the radar frontends 110$a$-110$c$. While the example with three of the multiple sparse arrays of physical antenna data 302$a$-302$c$ is shown, the CVAI 130 may be configured to generate the dense centralized virtual antenna data array 354 in response to any number of the radar frontends 110$a$-110$n$.

The multiple sparse arrays of physical antenna data 302$a$-302$c$ may each comprise a number of the physical antenna data points 254$a$-254$i$. The physical antenna data points 254$a$-254$i$ and/or the sparse array of physical antenna data 302 may be described in association with FIG. 7. Since the radar frontends 110$a$-110$n$ may comprise the sparse antenna array 250, the number of the physical antenna data points 254$a$-254$i$ in each of the multiple sparse arrays of physical antenna data 302$a$-302$c$ may be limited. The limited number of the physical antenna data points 254$a$-254$i$ of the multiple sparse arrays of physical antenna data 302$a$-302$c$ may provide a low volume of data from each of the radar frontends 110$a$-110$c$.

The low volume of raw radar data in the physical antenna data points 254$a$-254$i$ may be communicated over the data network 52 as each of the signals LVD_A-LVD_C (or LVD_A-LVD_N if more of the radar frontends 110$a$-110$n$ are implemented). The physical antenna data points 254$a$-254$i$ may be received by the centralized processing device 102. The CVAI 130 may implement the VAI technology for each of the radar frontends 110$a$-110$n$. The CVAI 130 may be configured to combine all the multiple sparse arrays of physical antenna data 302$a$-302$c$ to generate the dense centralized virtual antenna data array 354. The dense centralized virtual antenna data array 354 may be created from the multiple sparse arrays of physical antenna data 302$a$-302$c$ with virtual extrapolation and/or interpolation.

Due to the centralized nature of the centralized processing device 102, the centralized radar processing 170 may be configured to receive the physical antenna data points 254$a$-254$i$ from each of the radar frontends 110$a$-110$n$ in parallel. Since all of the radar frontends 110$a$-110$n$ implemented by the apparatus 100 may feed continuous data (e.g., the low volume radar data LVD_A-LVD_N), the CVAI 130 may have access to a vast number of data points (e.g., far greater than from a single one of the radar frontends 110$a$-110$n$ alone). In one example, the CVAI 130 may have access to ten of the radar frontends 110$a$-110$n$, which may each implement a 4×3 antenna array, for a total of 120 of the physical antenna data points 254$a$-254$i$. The centralized virtual aperture imaging technology implemented may enable the creation of the dense virtual antenna data array 354 from multiple sources of sparse physical antenna.

The dense centralized array of virtual antenna data 354 may comprise a number of rows and columns of centralized data points $356aa$-$356zy$. The dense centralized virtual antenna data array $344$ may comprise z rows and y columns of the centralized data points $356aa$-$356zy$. The number of the centralized data points $356aa$-$356zy$ may be much greater than the number of data points $306aa$-$306mn$ implemented by one of implemented of the dense virtual antenna data array $304$. In an example, the CVAI $130$ may be configured to generate 1920 or even more of the centralized data points $356aa$-$356zy$ from the $120$ of the physical antenna data points $254a$-$254i$. The size, shape and/or arrangement of the centralized data points $356aa$-$356zy$ in the dense centralized virtual antenna data array $354$ may be varied according to the design criteria of a particular implementation.

The dense centralized array of virtual antenna data $354$ may comprise the physical antenna data points $254a$-$254i$ from each of the multiple sparse arrays of antenna data $302a$-$302c$. The dense centralized array of virtual antenna data $354$ may comprise a number of the extrapolated virtual data points $310a$-$310z$ and a number of the extrapolated virtual data points $312a$-$312z$. The number of physical antenna data points $254a$-$254i$, the number of the extrapolated virtual antenna data points $310a$-$310z$ and/or the number of the interpolated virtual antenna data points $312a$-$312z$ may be generated in response to radar data aggregated from all of the edge sites of the vehicle $50$. In an example, the dense centralized array of virtual antenna data $354$ may enable a full 360 degree map of radar data to be acquired based on sparsity. With the massive number of the centralized data points $356aa$-$356zy$ generated for the dense centralized array of virtual antenna data $354$, the centralized processing device $102$ may generate highly detailed information about the environment $40$.

Figure 9:
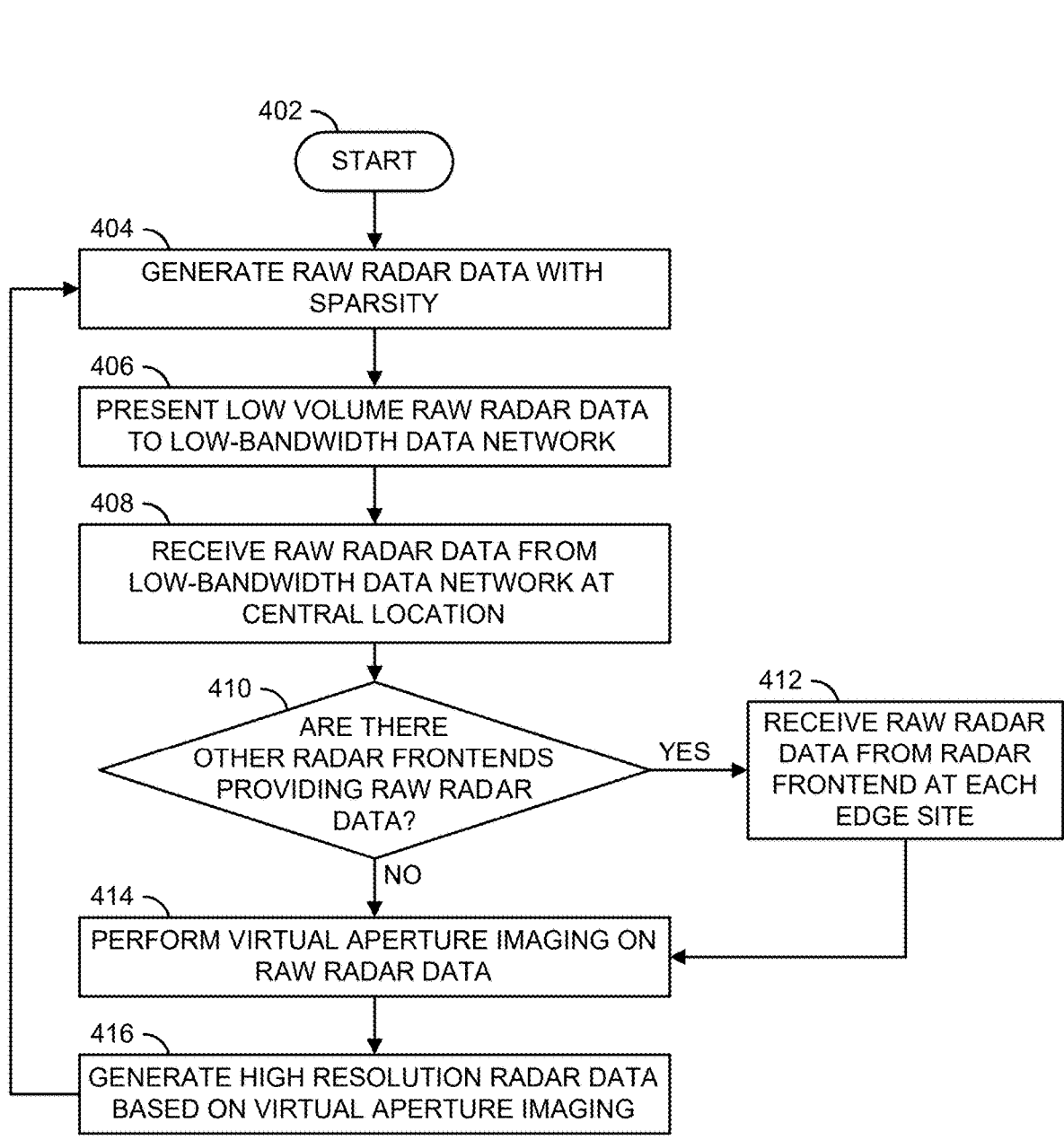
FIG. 9 is a flow diagram illustrating a method for implementing a centralized radar with sparse antennas.

Referring to FIG. 9, a method (or process) $400$ is shown. The method $400$ may implement a centralized radar with sparse antennas. The method $400$ generally comprises a step (or state) $402$, a step (or state) $404$, a step (or state) $406$, a step (or state) $408$, a decision step (or state) $410$, a step (or state) $412$, a step (or state) $414$, and a step (or state) $416$.

The step $402$ may start the method $400$. In the step $404$, one or more of the radar frontends $110a$-$110n$ may each generate the raw radar data LVD_A-LVD_N with sparsity. In an example, the radar frontends $110a$-$110n$ may each implement the sparse antenna array $250$ at various edge sites of the vehicle $50$. Next, in the step $406$, one or more of the radar frontends $110a$-$110n$ may present the low volume raw radar data LVD_A-LVD_N to the low-bandwidth data network $52$. For example, the low volume of the raw radar data LVD_A-LVD_N with sparsity may provide a limited amount of data that may help prevent the data network $52$ from becoming saturated. In the step $408$, the radar data interface $104$ may receive the raw radar data LVD_A-LVD_N from the low-bandwidth data network $52$ at a centralized location. In an example, the centralized processing device $102$ may be implemented at a generally central location of the vehicle $50$. In another example, the centralized processing device $102$ may be implemented in a particular zone of the vehicle $50$ that may be generally central to a subset of sensors and/or a subset of the radar frontends $110a$-$110n$ of the vehicle $50$. Next, the method $400$ may move to the decision step $410$.

In the decision step $410$, the centralized processing device $102$ may determine whether there are other of the radar frontends $110a$-$110n$ that may provide the raw radar data. Generally, each of the radar frontends $110a$-$110n$ may continually stream the raw radar data to the centralized processing device $102$. In some embodiments, the dynamic scheduling module $200$ may select a particular group and/or subset of the radar frontends $110a$-$110n$ to generate the sparse raw radar data. In the example shown, the steps $410$-$414$ may be shown as sequential steps. However, the steps $410$-$414$ may be performed in parallel and/or substantially in parallel. If there are other of the radar frontends $110a$-$110n$ that may still provide the raw radar data LVD_A-LVD_N, then the method $400$ may move to the step $412$. In the step $412$, the radar data interface $104$ may receive the raw radar data LVD_A-LVD_N from the radar frontends $110a$-$110n$. Next, the method $400$ may move to the step $414$. In the decision step $410$, if there are no other radar frontends $110a$-$110n$ that may provide the raw radar data LVD_A-LVD_N, then the method $400$ may move to the step $414$.

In the step $414$, the centralized processing device $102$ may perform the virtual aperture imaging on the raw radar data LVD_A-LVD_N. In an example, the centralized processing device $102$ may use the sparse raw radar data LVD_A-LVD_N as input for the virtual aperture imaging performed by the CVAI $130$. Next, in the step $416$, the centralized processing device $102$ may generate high resolution radar data based on the virtual aperture imaging. In an example, the virtual aperture imaging may generate the high resolution radar data based on the sparse raw radar data LVD_A-LVD_N. The high resolution radar data may comprise radar detections that may be provided by the signal OUT. Next, the method $400$ may return to the step $404$.

Figure 10:
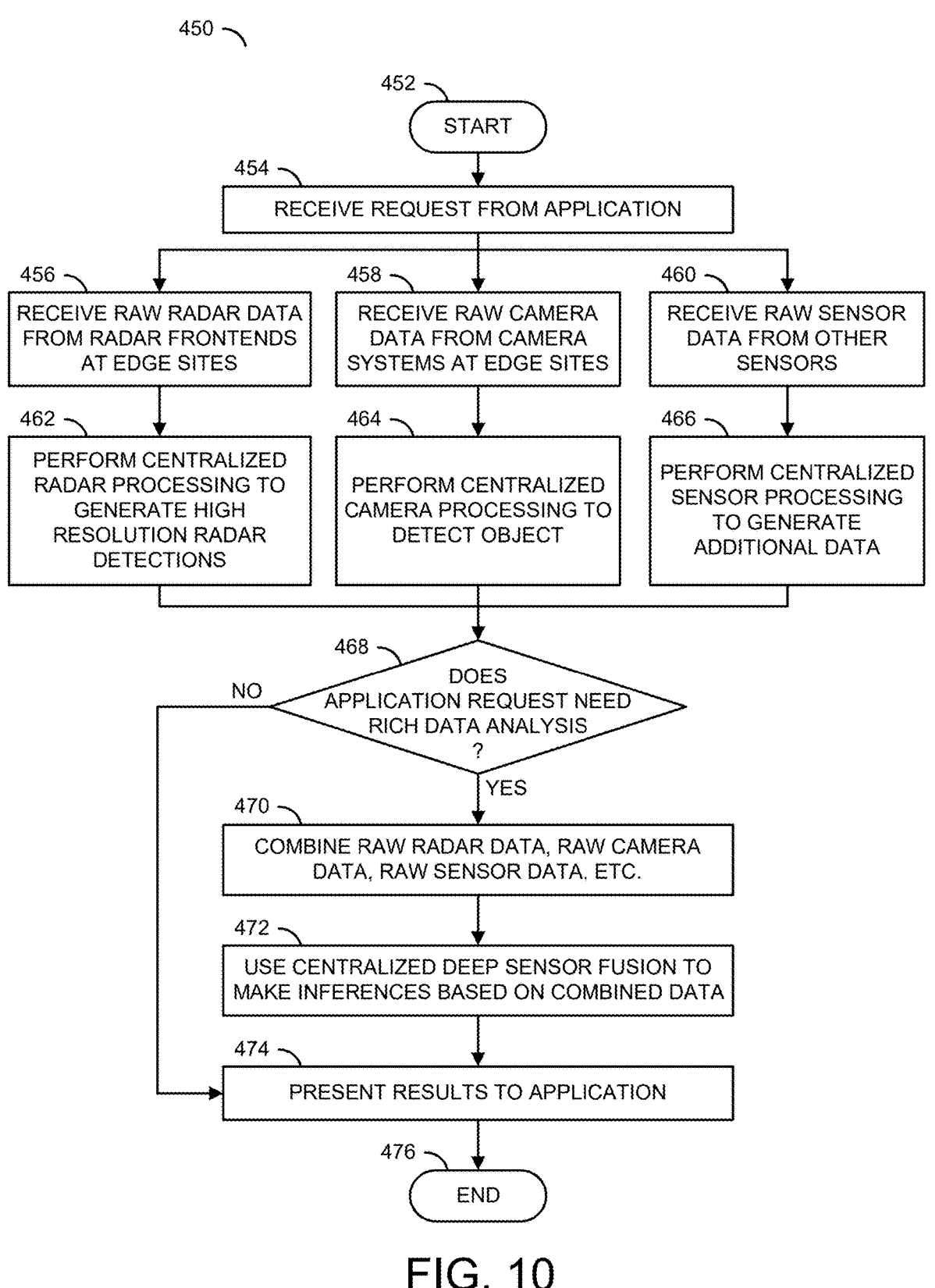
FIG. 10 is a flow diagram illustrating a method for implementing centralized deep sensor fusion at a central processor.

Referring to FIG. 10, a method (or process) $450$ is shown. The method $450$ may implement centralized deep sensor fusion at a central processor. The method $450$ generally comprises a step (or state) $452$, a step (or state) $454$, a step (or state) $456$, a step (or state) $458$, a step (or state) $460$, a step (or state) $462$, a step (or state) $464$, a step (or state) $466$, a decision step (or state) $468$, a step (or state) $470$, a step (or state) $472$, a step (or state) $474$, and a step (or state) $476$.

The step $452$ may start the method $450$. In the step $454$, the centralized deep sensor fusion module $132$ may receive a request from an application. The signal REQ may provide the request. Various applications may send requests for data to the centralized processing device $102$ and the centralized processing device $102$ may provide the signal OUT comprising the requested data corresponding to the request signal REQ. The applications may comprise programs run by various modules implemented by the vehicle $50$ (e.g., an infotainment center, ECUs, dashboard components, etc.) and/or third party devices that may connect to the vehicle $50$ (e.g., traffic networks, GPS/GNSS networks, smartphones, etc.). Next, the method $450$ may move to the steps $456$-$460$. Generally, the steps $456$-$466$ may be performed in parallel and/or substantially in parallel with each other.

In the step $456$, the radar data interface $104$ may receive the raw radar data LVD_A-LVD_N from the radar frontend devices $110a$-$110n$ implemented at the edge sites of the vehicle $50$. Next, in the step $462$, the central processor $120$ and the central memory $122$ may perform the centralized radar processing $170$ on the raw radar data LVD_A-LVD_N in order to generate the high resolution radar detections. Next, the method $450$ may move to the decision step $468$.

In the step $458$, the video data interface $106$ may receive the raw pixel data RCD_A-RCD_N from the camera systems $54a$-$54n$ implemented at the edge sites of the vehicle $50$. Next, in the step $464$, the central processor $120$ and the central memory $122$ may perform the centralized camera processing $172$ on the raw video data RCD_A-RCD_N in order to detect objects. Next, the method $450$ may move to the decision step $468$.

In the step 460, the sensor data interface 162*a*-162*n* may receive the raw pixel data OSD_A-OSD_N from the other sensors 160*a*-160*n* implemented at the edge sites of the vehicle 50. Next, in the step 466, the central processor 120 and the central memory 122 may perform the centralized sensor processing 174 on the raw sensor data OSD_A-OSD_N in order to generate additional data. Next, the method 450 may move to the decision step 468.

In the decision step 468, the centralized deep sensor fusion module 132 may determine whether the application request(s) may be reliant on rich data analysis. The rich data analysis may be performed based on the raw data from the radar frontends 110*a*-110*n*, the camera systems 54*a*-54*n* and/or the other sensors 160*a*-160*n*. For example, some of the application requests may request the output data directly from one or more of the centralized radar processing 170 (e.g., radar detections), the centralized camera processing 172 (e.g., the video frames and/or objects detected) and/or the centralized sensor processing 174 (e.g., a sensor result). If the application request(s) are not reliant on the rich data analysis, then the method 450 may move to the step 474. If the application request(s) are reliant on the rich data analysis, then the method 450 may move to the step 470.

In the step 470, the centralized deep sensor fusion module 132 may combine the raw radar data LVD_A-LVD_N, the raw camera data RCD_A-RCD_N and/or the raw sensor data OSD_A-OSD_N. The raw data from the various types of input devices may provide the rich source of data for analysis. Next, in the step 472, the centralized deep sensor fusion module 132 may perform sensor fusion in order to make inferences based on the combination of data. Next, the method 450 may move to the step 474.

In the step 474, the centralized processing device 102 may present the results generated in response to the request to the application. In one example, the signal OUT provided in response to the request REQ may comprise the results generated by the centralized radar processing 170 (e.g., radar detections), the centralized camera processing 172 (e.g., the video frames and/or objects detected) and/or the centralized sensor processing 174 (e.g., a sensor result). In another example, the signal OUT provided in response to the request REQ may comprise the results generated in response to the sensor fusion analysis performed by the centralized deep sensor fusion module 132. Next, the method 450 may move to the step 474. The step 474 may end the method 450.

Figure 11:
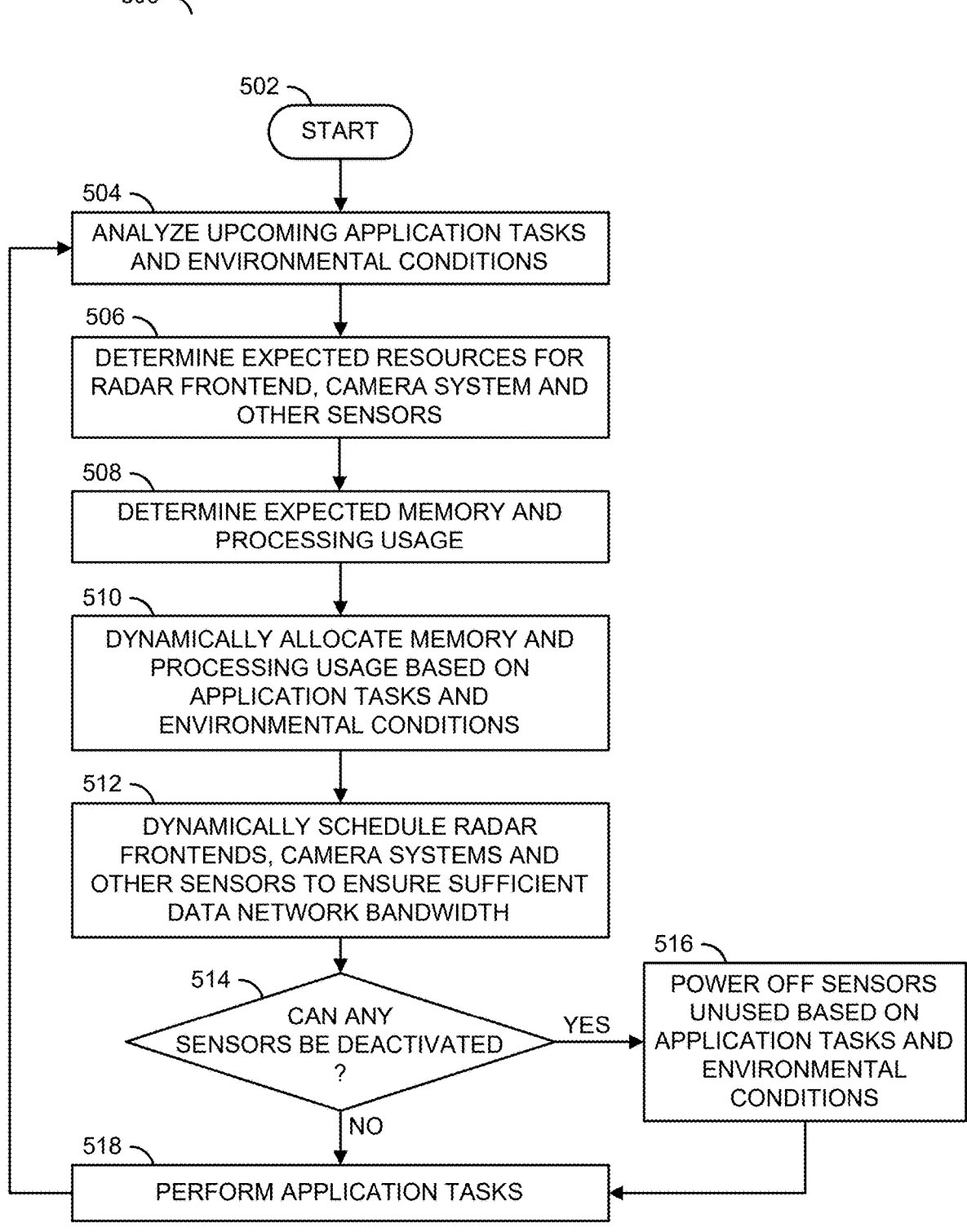
FIG. 11 is a flow diagram illustrating a method for performing dynamic resource allocation and scheduling.

Referring to FIG. 11, a method (or process) 500 is shown. The method 500 may perform dynamic resource allocation and scheduling. The method 500 generally comprises a step (or state) 502, a step (or state) 504, a step (or state) 506, a step (or state) 508, a step (or state) 510, a step (or state) 512, a decision step (or state) 514, a step (or state) 516, and a step (or state) 518.

The step 502 may start the method 500. In the step 504, the dynamic resource allocation module 134 and/or the dynamic scheduling module 200 may analyze upcoming application tasks and/or environmental conditions. In an example, the environmental conditions may be determined by the centralized deep sensor fusion module 132. In another example, the upcoming application tasks may be provided by the signal REQ. Next, in the step 506, the dynamic scheduling module 200 may determine expected resources that may be used for the radar frontends 110*a*-110*n*, the camera systems 54*a*-54*n* and/or the other sensors 160*a*-160*n* based on the environment 40 and/or the upcoming tasks. In the step 508, the dynamic resource allocation module 134 may determine expected usage of the central memory 122 and/or amount of processing by the central processor 120 that may be used based on the environment 40, the upcoming tasks, and/or the expected usage of the radar frontends 110*a*-110*n*, the camera systems 54*a*-54*n* and/or the other sensors 160*a*-160*n*. Next, the method 500 may move to the step 510.

In the step 510, the dynamic resource allocation module 134 may dynamically allocate portions of the central memory 122 and/or allocation processing usage (e.g., cycles, cores, co-processors, etc.) of the central processor 120 based on the application tasks and/or conditions in the environment 40. For example, in clear conditions, more processing may be allocated to the centralized camera processing 172 since all the camera systems 54*a*-54*n* may provide data. In another example, a proximity warning when the vehicle is in a low power state (e.g., security detections when the vehicle 50 is parked) may rely on the centralized radar processing 170, which may use less processing than video data. Next, in the step 512, the dynamic scheduling module 200 may dynamically schedule the radar frontends 110*a*-110*n*, the camera systems 54*a*-54*n* and/or the other sensors 160*a*-160*n* to ensure sufficient bandwidth is available on the data network 52. In an example, the signals DSCHED_A-DSCHED_N, the signals DC A-DC N and/or the signals DOSD_A-DOSD_N may activate, deactivate, control a power cycle, control a volume of data of the various sensors implemented by the vehicle 50. In an example, the radar frontends 110*a*-110*n* may be scheduled to temporarily provide less data when the camera systems 54*a*-54*n* are scheduled to generate 4k video data. Next, the method 500 may move to the decision step 514.

In the decision step 514, the dynamic scheduling module 200 may determine whether any of the sensors (e.g., the radar frontends 110*a*-110*n*, the camera systems 54*a*-54*n* and/or the other sensors 160*a*-160*n*) may be deactivated. In an example, one or more sensors may be disabled to conserve power. For example, when the camera systems 54*a*-54*n* and the radar frontends 110*a*-110*n* are operating, other sensors (such as lidar, sonar and ultrasonics) may be deactivated to conserve power. In another example, when the vehicle 50 is idling, some sensors and/or resources may be turned off (e.g., sensors and/or ECUs that may provide lane departure warnings). If one or more sensors may be deactivated, then the method 500 may move to the step 516. In the step 516, the dynamic scheduling module 200 may power off sensors that may be unused based on application tasks and/or conditions in the environment 40. For example, in foggy conditions, the camera systems 54*a*-54*n* may not provide useful data and the signals DC A-DC N may be used to temporarily power off the camera systems 54*a*-54*n*. In another example, when the camera systems 54*a*-54*n* are obscured (e.g., covered in mud), the camera systems 54*a*-54*m* may not provide useful data and the signals DC_A-DC_N may be used to temporarily power off the camera systems 54*a*-54*n* and then reactivate the camera systems 54*a*-54*n* when cleaned (e.g., the video data may be tested periodically to determine if the lenses of the camera systems 54*a*-54*n* have been cleaned). Next, the method 500 may move to the step 518. In the decision step 514, if none of the sensors may be deactivated, then the method 500 may move to the step 518. In the step 518, the various functions that have been scheduled and/or have resources allocated to be performed may be performed in response to the application tasks (e.g., radar detections, video analysis, deep sensor fusion, CVAI, etc.). Next, the method 500 may return to the step 504.

Referring to FIG. 12, a method (or process) 550 is shown. The method 550 may perform centralized virtual aperture imaging using sparse raw radar data. The method 550 generally comprises a step (or state) 552, a step (or state) 554, a decision step (or state) 556, a step (or state) 558, a step (or state) 560, a decision step (or state) 562, a step (or state) 564, a step (or state) 566, a step (or state) 568, a step (or state) 570, a step (or state) 572, a step (or state) 574, a step (or state) 576, a step (or state) 578, and a step (or state) 580.

The step 552 may start the method 550. In the step 554, the receivers 142 may receive the reflected probe signals RX_A-RX_N. Next, in the decision step 556, the radar devices 110a-110n may determine whether the data generated by the receivers 142 has sparsity. In an example, if the receivers 142 comprise the dense antenna data array 280, the radar frontends 110a-110n may not have sparsity. If there is no sparsity, then the method 550 may move to the step 558. In the step 558, the data sparsification module 282 may perform data sparsification on the dense physical antenna data in order to generate the sparse physical antenna data 254a-254i. Next, the method 550 may move to the step 560. In the decision step 556, if there is sparsity, then the method 550 may move to the step 560. In the step 560, the radar frontends 110a-110n may communicate the low volume raw radar data LVD_A-LVD_N on the data network 52. Next, the method 550 may move to the decision step 562.

In the decision step 562, if the central processor 120 may determine whether there is raw radar data incoming from another one of the edge sites (e.g., the radar frontends 110a-110n). In the example shown, the steps 562-574 may be shown sequentially for illustrative purposes. Generally, the steps 562-574 may be performed in parallel and/or substantially in parallel. If there is more raw radar incoming, then the method 550 may move to the step 564. In the step 564, the radar data interface 104 may receive the raw radar data (e.g., one of the signals LVD_A-LVD_N) from a next one of the radar frontends 110a-110n. Next, in the step 566, the CVAI 130 may determine the physical antenna data points 254a-254i corresponding to one of the signals LVD_A-LVD_N. In the step 568, the CVAI 130 may perform virtual aperture imaging on the physical antenna data points 254a-254i. Next, the method 550 may move to the step 570.

In the step 570, the CVAI 130 may generate the extrapolated virtual antenna data points 310a-310z based on the sparse physical data points 254a-254i. Next, in the step 572, the CVAI 130 may generate the interpolated virtual antenna data points 312a-312z based on the sparse physical data points 254a-254i. In the step 574, the CVAI 130 may add the extrapolated virtual antenna data points 310a-310z and the interpolated virtual antenna data points 312a-312z to the dense centralized virtual antenna array 354. Next, the method 550 may return to the decision step 562. The steps 562-574 may be repeated to continually add more of the centralized data points 356aa-356zy to the dense centralized virtual antenna data 354. In the decision step 562, if there is no more raw radar data from other edge sites, then the method 550 may move to the step 578.

In the step 578, the central processor 120 may analyze the large data cube generated from the dense centralized virtual antenna data 354. Next, in the step 578, the central processor 120 may generate the high resolution radar detection data. The high resolution radar data may be constructed based on the boundary conditions captured from the aggregated sparse physical antenna data 254a-254i from each of the radar frontends 110a-110n. The high resolution radar detection data may be presented in the signal OUT. Next, the method 550 may move to the step 580. The step 580 may end the method 550.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICS (application specific integrated circuits), Platform ASICs, FPGAS (field programmable gate arrays), PLDs (programmable logic devices), CPLDs (complex programmable logic devices), sea-of-gates, RFICS (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMS (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive raw radar data from a plurality of radar devices, wherein (i) said plurality of said radar devices are each implemented at a respective edge site and (ii) said raw radar data comprises sparsity; and a processor configured to (i) receive said raw radar data corresponding to each of said radar devices from said interface, (ii) perform virtual aperture imaging in response to said raw radar data from each of said radar devices to virtually generate a large data cube, and (iii) generate high resolution radar data based on said large data cube, wherein (i) said sparsity is used to capture said raw radar data to enable said raw radar data to have a low data volume when communicated from each of said radar devices to said processor over a low bandwidth data network, (ii) said virtual aperture imaging is configured to enable said high resolution radar data to be generated from said low data volume, and (iii) said processor enables high data throughput at a central location for said raw radar data continuously streamed from said respective edge sites.

2. The apparatus according to claim 1, wherein (i) said edge sites are located throughout a vehicle and (ii) said raw radar data is communicated to said interface over said low bandwidth data network of said vehicle with said low data volume that does not saturate said low bandwidth data network.

3. The apparatus according to claim 2, wherein said low data volume of said raw radar data enables said low bandwidth data network to be a controller area network (CAN) bus of said vehicle.

4. The apparatus according to claim 1, wherein said processor is implemented with a central memory.

5. The apparatus according to claim 4, wherein (i) said processor enables more of said raw radar data to be processed centrally than an amount of data processed by a local processor implemented by each of said radar devices and (ii) said central memory comprises a greater capacity than an amount of memory for said local processor implemented by each of said radar devices.

6. The apparatus according to claim 1, wherein said plurality of said radar devices are configured to (i) perform waveform generation, modulation and power amplification to transmit data with said sparsity and (ii) perform analog to digital conversion, demodulation and signal conditioning to receive said raw radar data with said sparsity.

7. The apparatus according to claim 1, wherein said plurality of said radar devices are configured to generate said raw radar data with said sparsity without a local memory and without a local processor.

8. The apparatus according to claim 1, wherein said interface is further configured to receive raw sensor data from a plurality of sensors.

9. The apparatus according to claim 8, wherein (i) at least one of said plurality of sensors comprise a video capture device and said raw sensor data generated by said video capture device comprises pixel data and (ii) said processor is configured to process said pixel data arranged as video frames.

10. The apparatus according to claim 8, wherein said processor is further configured to perform a centralized deep sensor fusion to combine and evaluate said raw radar data from each of said radar devices and said raw sensor data.

11. The apparatus according to claim 10, wherein said combination and said evaluation enabled by said centralized deep sensor fusion enables said processor to make inferences about an environment that would not be possible from analyzing either said raw radar data or said raw sensor data alone.

12. The apparatus according to claim 10, wherein said centralized deep sensor fusion enables dynamic resource allocation in response to a particular task and the environment.

13. The apparatus according to claim 12, wherein said dynamic resource allocation comprises scheduling (i) a power cycle for each of said radar devices and each of said sensors, (ii) an amount of processing resources for said raw radar data and said raw sensor data and (iii) an amount of memory.

14. The apparatus according to claim 8, wherein said processor is further configured to (i) receive a request from an application, (ii) perform said virtual aperture imaging on said high resolution radar data, (iii) perform centralized processing on said raw sensor data to generate centralized sensor data, (iv) determine whether said request from said application relies on rich data analysis, (v) send said high resolution radar data and said centralized sensor data to said application if said request does not rely on said rich data analysis and (vi) combine said high resolution radar data and said centralized sensor data to make inferences for said rich data analysis and send said inferences to said application if said request does rely on said rich data analysis.

15. The apparatus according to claim 1, wherein (i) said raw radar data generated by each of said radar devices provides sparse physical antenna data, (ii) said virtual aperture imaging performed by said processor is configured to generate a combination of (a) extrapolated virtual antenna data and (b) interpolated virtual antenna data in response to said sparse physical antenna data and (iii) said combination of said extrapolated virtual antenna data and said interpolated virtual antenna data provides dense virtual antenna data.

16. The apparatus according to The apparatus according to wherein (i) said processor is configured to perform centralized virtual aperture imaging and (ii) said centralized virtual aperture imaging comprises (a) generating said combination of said extrapolated virtual antenna data and said interpolated virtual antenna data for each of said plurality of said radar devices, (b) combining said dense virtual antenna data from said plurality of said radar devices to create a dense virtual data array.

17. The apparatus according to claim 16, wherein said dense virtual data array enables a 360 degree radar map of an environment to be generated from said raw radar data generated with said sparsity.

18. The apparatus according to claim 1, wherein said apparatus is configured to implement a centralized radar architecture with sparse antennas.

19. A system comprising:
a plurality of radar devices, each configured to (i) generate raw radar data at a respective edge site and (ii) present said raw radar data to a low bandwidth data network, wherein said raw radar data comprises sparsity; and
a processor configured to (i) receive said raw radar data corresponding to each of said radar devices from said low bandwidth data network, (ii) perform virtual aperture imaging in response said raw radar data from each of said radar devices to virtually generate a large data cube, and (iii) generate high resolution radar data based on said large data cube, wherein (i) said sparsity is used to capture said raw radar data to enable said raw radar data to have a low data volume when communicated from each of said radar devices to said processor over said low bandwidth data network, (ii) said virtual aperture imaging is configured to enable said high resolution radar data to be generated from said low data volume, and (iii) said processor enables high data throughput at a central location for said raw radar data continuously streamed from said respective edge sites.

20. The system according to claim 19, wherein (i) one or more of said plurality of said radar devices comprises a dense antenna array, (ii) said radar devices comprising said dense antenna array are configured to perform data sparsification, (iii) said data sparsification enables a conversion of a high volume of said raw radar data generated by said dense antenna array to said raw radar data with said sparsity, (iv) said high volume of said raw radar data is not presented to said low bandwidth data network and (v) said raw radar data with said sparsity converted from said high volume of said raw radar data is presented to said low bandwidth data network.

* * * * *